(12) United States Patent
Logan et al.

(10) Patent No.: US 9,546,426 B2
(45) Date of Patent: *Jan. 17, 2017

(54) METHODS FOR HYDROGEN GAS PRODUCTION

(71) Applicant: The Penn State Research Foundation, University Park, PA (US)

(72) Inventors: Bruce E. Logan, State College, PA (US); Younggy Kim, State College, PA (US); Roland D. Cusick, Champaign, IL (US)

(73) Assignee: The Penn State Research Foundation, University Park, PA (US)

(*) Notice: Subject to any disclaimer, the term of this patent is extended or adjusted under 35 U.S.C. 154(b) by 128 days.

This patent is subject to a terminal disclaimer.

(21) Appl. No.: 14/200,922

(22) Filed: Mar. 7, 2014

(65) Prior Publication Data

US 2014/0251819 A1    Sep. 11, 2014

Related U.S. Application Data

(60) Provisional application No. 61/773,938, filed on Mar. 7, 2013.

(51) Int. Cl.
| | | |
|---|---|---|
| *C25B 1/02* | (2006.01) | |
| *C25B 9/08* | (2006.01) | |
| *C25B 15/08* | (2006.01) | |
| *C25B 1/04* | (2006.01) | |

(52) U.S. Cl.
CPC . *C25B 1/02* (2013.01); *C25B 1/04* (2013.01); *C25B 9/08* (2013.01); *C25B 15/08* (2013.01); Y02E 60/366 (2013.01); Y02P 20/129 (2015.11)

(58) Field of Classification Search
CPC ............... C25B 1/02; C25B 1/04; C25B 1/10; C25B 9/08; C25B 15/08
See application file for complete search history.

(56) References Cited

U.S. PATENT DOCUMENTS

| | | | |
|---|---|---|---|
| 3,171,799 | A | 3/1965 | Batchelder |
| 3,282,834 | A | 11/1966 | Justi et al. |
| 4,105,534 | A | 8/1978 | Beatty, III |
| 4,118,299 | A | 10/1978 | Maget |

(Continued)

FOREIGN PATENT DOCUMENTS

| | | | |
|---|---|---|---|
| JP | 11317247 A | * | 11/1999 |
| KP | KR1020080066460 | | 7/2008 |

(Continued)

OTHER PUBLICATIONS

Kim Y., et al., "Electrodialysis with Spacers: Effects of Variation and Correlation of Boundary Layer Thickness," Desalination, 274:54-63, 2011.

(Continued)

*Primary Examiner* — Nicholas A Smith
(74) *Attorney, Agent, or Firm* — Dinsmore & Shohl LLP

(57) ABSTRACT

According to aspects described herein, methods and systems provided by the present invention for hydrogen gas production include a RED stack including one or more RED subunits, and use of a saline material including a heat regenerable salt. The salinity driven energy, provided by the one or more RED subunits, completely eliminates the need for an external power source to produce hydrogen gas.

18 Claims, 6 Drawing Sheets

(56) References Cited

U.S. PATENT DOCUMENTS

| | | |
|---|---|---|
| 4,171,409 A | 10/1979 | Loeb |
| 4,362,790 A | 12/1982 | Blanchart et al. |
| 4,652,501 A | 3/1987 | Bennetto et al. |
| 4,891,404 A | 1/1990 | Narayan et al. |
| 5,256,501 A | 10/1993 | Hasvold et al. |
| 5,376,250 A | 12/1994 | Hamano |
| 5,427,871 A | 6/1995 | Garshol et al. |
| 5,683,558 A | 11/1997 | Sieck et al. |
| 5,723,098 A | 3/1998 | Salzburg et al. |
| 5,753,098 A | 5/1998 | Bess, Jr. et al. |
| 5,976,719 A | 11/1999 | Kim et al. |
| 6,090,266 A | 7/2000 | Roychowdhury |
| 6,217,822 B1 | 4/2001 | Borglum |
| 6,391,205 B1 | 5/2002 | McGinnis |
| 6,887,692 B2 | 5/2005 | Paterek |
| 7,226,675 B2 | 6/2007 | Ovshinsky et al. |
| 7,491,453 B2 | 2/2009 | Logan et al. |
| 7,709,113 B2 | 5/2010 | Logan et al. |
| 7,736,791 B1 | 6/2010 | Merz |
| 7,922,878 B2 | 4/2011 | Logan |
| 8,137,522 B2 | 3/2012 | Sparrow et al. |
| 8,277,984 B2 | 10/2012 | Logan |
| 8,440,438 B2 | 5/2013 | Cheng et al. |
| 2002/0025469 A1 | 2/2002 | Heller |
| 2003/0132097 A1 | 7/2003 | Kenet et al. |
| 2004/0094406 A1 | 5/2004 | Sawada |
| 2004/0219400 A1 | 11/2004 | Al-Hallaj et al. |
| 2005/0095466 A1 | 5/2005 | Minteer et al. |
| 2005/0145568 A1 | 7/2005 | Mc Ginnis |
| 2005/0161342 A1 | 7/2005 | Carson et al. |
| 2006/0011489 A1 | 1/2006 | Swanepoel et al. |
| 2006/0011491 A1 | 1/2006 | Logan et al. |
| 2006/0147763 A1 | 7/2006 | Angenent et al. |
| 2006/0160200 A1 | 7/2006 | Rathenow et al. |
| 2006/0172186 A1 | 8/2006 | Tender |
| 2006/0234110 A1 | 10/2006 | Bergel |
| 2006/0251959 A1 | 11/2006 | Karamanev |
| 2006/0263646 A1 | 11/2006 | Seale |
| 2007/0034514 A1 | 2/2007 | Riera |
| 2007/0042480 A1 | 2/2007 | Rozendal et al. |
| 2007/0062820 A1 | 3/2007 | Smotkin |
| 2007/0172710 A1 | 7/2007 | Kruesi |
| 2007/0196722 A1 | 8/2007 | Tomita et al. |
| 2007/0259216 A1 | 11/2007 | Logan |
| 2007/0259217 A1 | 11/2007 | Logan |
| 2008/0220292 A1 | 9/2008 | Rabaey et al. |
| 2008/0230376 A1 | 9/2008 | Brauns |
| 2008/0251445 A1 | 10/2008 | Kamleiter et al. |
| 2008/0277273 A1 | 11/2008 | Logan |
| 2008/0286624 A1 | 11/2008 | Lovley et al. |
| 2008/0292912 A1 | 11/2008 | Logan et al. |
| 2009/0029198 A1 | 1/2009 | Jin et al. |
| 2009/0297431 A1 | 12/2009 | McGinnis et al. |
| 2009/0317882 A1 | 12/2009 | Cheng et al. |
| 2010/0119920 A1 | 5/2010 | Logan et al. |
| 2010/0270158 A1 | 10/2010 | Logan |
| 2011/0044824 A1* | 2/2011 | Kelada ............... F03G 7/005 417/53 |
| 2011/0281139 A1 | 11/2011 | Huang et al. |
| 2011/0311887 A1 | 12/2011 | He |
| 2012/0012511 A1* | 1/2012 | Kim ............... B01D 61/002 210/170.11 |
| 2012/0292187 A1 | 11/2012 | Kim et al. |

FOREIGN PATENT DOCUMENTS

| | | |
|---|---|---|
| NO | 168145 | 10/1991 |
| WO | 91/03079 A1 | 3/1991 |
| WO | 0139306 A1 | 5/2001 |
| WO | 2004/015172 A2 | 2/2004 |
| WO | 2005005981 A2 | 1/2005 |
| WO | 2007010313 A2 | 1/2007 |
| WO | 2007113314 A1 | 10/2007 |
| WO | 2008/063843 A2 | 5/2008 |
| WO | 2008/109962 A1 | 9/2008 |
| WO | 2010045072 A2 | 4/2010 |

OTHER PUBLICATIONS

Kim Y., et al., "Hydrogen Production from Inexhaustible Supplies of Fresh and Salt Water Using Microbial Reverse-Electrodialysis Electrolysis Cells," PNAS, 108(39):16176-81, 2011.

Kim Y., et al., "Microbial Reverse Electrodialysis Cells for Synergistically Enhanced Power Production," Environ. Sci. Technol., 45:5834-39, 2011.

Lacey R.E., "Energy by Reverse Electrodialysis," Ocean Engineering, 7:1-47, 1980.

Lisbona P., et al., "High-temperature Fuel Cells for Fresh Water Production," Desalination, 182:471-482, 2005.

Liu H., et al., "Production of Electricity during Wastewater Treatment Using a Single Chamber Microbial Fuel Cell," Environ. Sci. Technol., 38:2281-2285, 2004.

Liu H., et al., "Electricity Generation Using an Air-Cathode Single Chamber Microbial Fuel Cell in the Presence and Absence of a Proton Exchange Membrane," Environ. Sci. Technol., 38:4040-4046, 2004.

Liu H., et al, "Production of Electricity from Acetate or Butyrate Using a Single-Chamber Microbial Fuel Cell," Environ. Sci. Technol., 39(2):658-662, 2005.

Liu H., et al., "Electrochemically Assisted Microbial Production of Hydrogen from Acetate," Environ. Sci. Technol., 39:4317-4320, 2005.

Liu H., et al., "Power Generation in Fed-Batch Microbial Fuel Cells as a Function of Ionic Strength, Temperature, and Reactor Configuration," Environ. Sci. Technol., 39:5488-5493, 2005.

Logan B.E., "Transport of Chemicals Present as Pure Phases," Transport of Chemicals Present as Pure Phases, 399-405, 1999.

Logan B.E., et al., "Biological Hydrogen Production Measured in Batch Anaerobic Respirometers," Environ. Sci. Technol., 36:2530-2535, 2002.

Logan B.E., "Extracting Hydrogen and Electricity from Renewable Resources," Environ. Sci. Technol., 38:160A-166A, 2004.

Logan B.E., et al., "Electricity Generation from Cysteine in a Microbial Fuel Cell," Water Research, 39:942-952, 2005.

Logan B.E., et al, "Microbial Fuel Cells: Methodology and Technology," Environ. Sci. Technol., 40(17):5181-5192, 2006.

Logan B.E., et al., "Electricity-Producing Bacterial Communities in Microbial Fuel Cells," TRENDS in Microbiology, 14 (12):512-518, 2006.

Logan B.E., et al., "Graphite Fiber Brush Anodes for Increased Power Production in Air-Cathode Microbial Fuel Cells," Environ. Sci. Technol., 41(9):3341-3346, 2007.

Logan B.E., et al, "Microbial Electrolysis Cells for High Yield Hydrogen Gas Production from Organic Matter," Environ. Sci. Technol., 42(23):8630-8640, 2008.

Logan B.E., "Exoelectrogenic Bacteria that Power Microbial Fuel Cells," Nat. Rev. Microbiol., 7(5):375-381, 2009.

Logan B.E., et al., "Conversion of Wastes into Bioelectricity and Chemicals by Using Microbial Electrochemical Technologies," Science, 337:686-90, 2012.

Logan B.E., et al., "Membrane-Based Processes for Sustainable Power Generation Using Water," Nature, 488:313-19, 2012.

Lovley D., et al., "Anaerobic Oxidation of Toluene, Phenol, and p-Cresol by the Dissimilatory Iron-Reducing Organism, GS-15," Applied and Environmental Microbiology, 56(6):1858-1864, 1990.

Lovley D., "Microbial Energizers: Fuel Cells That Keep on Going," Microbe, 1(7):323-329, 2006.

Lovley D., et al., "Novel Mode of Microbial Energy Metabolism: Organic Carbon Oxidation Coupled to Dissimilatory Reduction of Iron or Manganese," Appl. Enrivon. Microbiol., 54(6):1472-1480, 1988.

Lowy D., et al., "Harvesting Energy from the Marine Sediment—Water Interface II Kinetic Activity of Anode Materials," Biosensors and Bioelectronics, 21:2058-2063, 2006.

(56) References Cited

OTHER PUBLICATIONS

Luo X., et al., "Power Generation by Coupling Reverse Electrodialysis and Ammonium Bicarbonate: Implication for Recovery of Waste Heat," Electrochemistry Communications, 19:25-28, 2012.
McCutcheon J., et al., "A Novel Ammonia-Carbon Dioxide Forward (Direct) Osmosis Desalination Process," Desalination, 174:1-11, 2005.
McGinnis R., et al., "Energy Requirements of Ammonia-Carbon Dioxide Forward Osmosis Desalination," Desalination, 207:370-82, 2007.
Mehanna M., et al., "Using Microbial Desalination Cells to Reduce Water Salinity Prior to Reverse Osmosis," Energy Enrivon. Sci., 3:1114-1120, 2010.
Min B. et al. "Continuous Electricity Generation from Domestic Wastewater and Organic Substrates in a Flat Plate Microbial Fuel Cell," Environ. Sci. Technol., 38:5809-5814, 2004.
Min B., "Perchlorate Remediation Using Packed-bed Bioreactors and Electricity Generation in Microbial Fuel Cells (MFCs)," Thesis submitted to the Pennsylvania State University, The Graduate School, Department of Civil and Environmental Engineering, May 2005.
Miyake J., et al., "Biotechnological Hydrogen Production: Research for Efficient Light Energy Conversion," Journal of Biotechnology, 70:89-101, 1999.
Nagarale R.K., et al., "Recent Developments on Ion-exchange Membranes and Electro-membrane Processes," Advances in Colloid and Interface Science, 119:997-130, 2006.
Nam J., et al., "Hydrogen Generation in Microbial Reverse-Electrodialysis Electrolysis Cells Using a Heat-Regenerated Salt Solution," Environ. Sci. Technol., 46:5240-46, 2012.
Nath K., et al., "Improvement of Fermentative Hydrogen Production: Various Approaches," Applied Microbiology and Biotechnology, 65:520-529, 2004.
Niessen J., et al., "Fluorinated Polyanilines as Superior Materials for Electrocatalytic Anodes in Bacterial Fuel Cells," Electrochemistry Communications, 6:571-575, 2004.
Oh S., et al., "Cathode Performance as a Factor in Electricity Generation in Microbial Fuel Cells," Environ. Sci. Technol., 38:4900-4904, 2004.
Oh S., et al., "Proton Exchange Membrane and Electrode Surface Areas as Factors that Affect Power Generation in Microbial Fuel Cells," Applied Microbiology and Biotechnology, 70:162-169, 2006.
Oh S., et al., "Voltage Reversal During Microbial Fuel Cell Stack Operation," Journal of Power Sources, 167:11-17, 2007.
Olivares-Ramírez J.M., et al., "Studies on the Hydrogen Evolution Reaction on Different Stainless Steels," International Journal of Hydrogen Energy, 32:3170-3173, 2007.
Pant D., et al., "A Review of the Substrates Used in Microbial Fuel Cells (MFCs) for Sustainable Energy Production," Bioresour. Technol., 101:1533-1543, 2010.
Park D., et al., "Electricity Generation in Microbial Fuel Cells Using Neutral Red as an Electronophore," Applied and Environmental Microbiology, 66:1292-1297, 2000.
Park H., et al., "A Novel Electrochemically Active and Fe(III)-reducing Bacterium Phylogenetically Related to Clostridium butyricum Isolated from a Microbial Fuel Cell," Anaerobe, 7:297-306, 2001.
Park D., et al., "Improved Fuel Cell and Electrode Designs for Producing Electricity from Microbial Degradation," Biotechnology and Bioengineering, 81:348-355, 2002.
Post J.W., et al., "Salinity-Gradient Power: Evaluation of Pressure-Retarded Osmosis and Reverse Electrodialysis," J. Membr. Sci., 288:218-230, 2007.
Post J.W., et al., "Energy Recovery from Controlled Mixing Salt and Fresh Water with a Reverse Electrodialysis System," Enrivon. Sci. Technol., 42(15):5785-5790, 2008.
Rabaey K., et al., "A Microbial Fuel Cell Capable of Converting Glucose to Electricity at High Rate and Efficiency," Biotechnology Letters, 25:1531-1535, 2003.
Rabaey K., et al., "Microbial Fuel Cells for Sulfide Removal," Environ. Sci. Technol., 40:5218-5224, 2006.
Raz S., et al., "Supported Mixed-Gas Fuel Cells," Solid State Ionics, 149:335-341, 2002.
Reimers C.E., et al., "Harvesting Energy from the Marine Sediment-Water Interface," Environ. Sci. Technol., 35:192-195, 2001.
Allen R., et al., "Microbial Fuel-Cells: Electricity Production from Carbohydrates," Applied Biochemistry and Biotechnology, 39-40:27-40, 1993.
Angenent L., et al., "Production of Bioenergy and Biochemicals from Industrial and Agricultural Wastewater," TRENDS in Biotechnology, 22(9):477-485, 2004.
Benemann J., et al., "A Novel Photobiological Hydrogen Production Process," Proceedings of the 13th International Congress on Photosynthesis (Montreal, Canada) Eds, Van der Est and Bruce, 878-880, 2004.
Bergel A., "Catalysis of Oxygen Reduction in PEM Fuel Cell by Seawater Biofilm," Electrochemistry Communications, 7:900-904, 2005.
Biffinger J., "Engineering Microbial Fuels Cells: Recent Patents and New Directions," Recent Patents on Biotechnology, 2:150-155, 2008.
Biniak S., et al., "Modified Porous Carbon Materials as Catalytic Support for Cathodic Reduction of Dioxygen," Fuel Processing Technology 79:251-257, 2002.
Bond D., et al., "Electrode-Reducing Microorganisms That Harvest Energy from Marine Sediments," Science, 295:483-485, 2002.
Bond D., et al., "Electricity Production by Geobacter sulfurreducens Attached to Electrodes," Applied and Environmental Microbiology, 69(3):1548-1555, 2003.
Brauns E., "Salinity Gradient Power by Reverse Electrodialysis: Effect of Model Parameters on Electrical Power Outlet," Desalination, 237:378-391, 2009.
Brennan R., et al., "Chitin and Corncobs as Electron Donor Sources for the Reductive Dechlorination of Tetrachloroethene," Water Research, 40:2125-2134, 2006.
Cai M., et al., "Enhanced Biohydrogen Production from Sewage Sludge with Alkaline Pretreatment," Environ. Sci. Technol., 38:3195-3202, 2004.
Call D., et al, "Hydrogen Production in a Single Chamber Microbial Electrolysis Cell Lacking a Membrane," Environ. Sci. Technol., 42:3401-3406, 2008.
Call D., et al., "High Surface Area Stainless Steel Brushes as Cathodes in Microbial Electrolysis Cells," Environmental Science and Technology, 43:2179-2183, 2009.
Cao X., et al., "A New Method for Water Desalination Using Microbial Desalination Cells," Environ. Sci. Technol., 43:7148-52, 2009.
Chaudhuri S., et al., "Electricity Generation by Direct Oxidation of Glucose in Mediatorless Microbial Fuel Cells," Nature Biotechnology, 21(10):1229-1232, 2003.
Chen W., et al., "Ammonia-Tailoring of GAC to Enhance Perchlorate Removal: Characterization of NH3 Thermally Tailored GACs," Carbon, 43:573-580, 2005.
Cheng S., et al., "Intensification of Water Electrolysis in a Centrifugal Field," Journal of The Electrochemical Society, 149(11):D172-D177, 2002.
Cheng S., et al., "Optimization of Air Cathode Used in One-Chamber Microbial Fuel Cells," Extended Abstract, Proceedings of the 228th American Chemical Society Annual Meeting, 2004.
Cheng S., et al., "Power Densities Using Different Cathode Catalysts (Pt and CoTMPP) and Polymer Binders (Nafion and PTFE) in Single Chamber Microbial Fuel Cells," Environ. Sci. Technol., 40:364-369, 2006.
Cheng S., et al., "Increased Power Generation in a Continuous Flow MFC with Advective Flow through the Porous Anode and Reduced Electrode Spacing," Environ. Sci. Technol., 40:2426-32, 2006.
Cheng S., et al., "Increased Performance of Single-Chamber Microbial Fuel Cells Using an Improved Cathode Structure," Electrochem. Commun., 8:489-494, 2006.

(56) References Cited

OTHER PUBLICATIONS

Cheng S., et al., "Ammonia Treatment of Carbon Cloth Anodes to Enhance Power Generation of Microbial Fuel Cells," Electrochem. Commun., 9(3):492-496, 2007.
Cheng S., et al., "Sustainable and Efficient Biohydrogen Production Via Electrohydrogenesis," Proc. Natl. Acad. Sci. U.S.A., 104:18871-18873, 2007.
Chiou C., et al., "Contaminant Sorption by Soil and Bed Sediment: Is There a Difference?" U.S. Department of the Interior, U.S. Geological Survey: Reston, VA, 2000.
Clauwaert P., et al., "Biological Denitrification in Microbial Fuel Cells," Environ. Sci. Technol., 41:3354-60, 2007.
Cooper K.R., et al., "Electrical Test Methods for On-line Fuel Cell Ohmic Resistance Measurement," Journal of Power Sources, 160:1088-1095, 2006.
Cord-Ruwisch R., et al., "Growth of Geobacter sulfurreducens with Acetate in Syntrophic Cooperation with Hydrogen-Oxidizing Anaerobic Partners," Applied and Environmental Microbiology, 64(6):2232-2236, 1998.
Cusick R., et al., "Energy Capture from Thermolytic Solutions in Microbial Reverse-Electrodialysis Cells," Science, 335:1474-77, 2012.
Ditzig J., "Production of Hydrogen from Domestic Wastewater Using a Bioelectrochemically Assisted Microbial Reactor (BEAMR)," International Journal of Hydrogen Energy, 32:2296-2304, 2007.
D?Ugo?Ecki P., "Practical Potential of Reverse Electrodialysis as Process for Sustainable Energy Generation," Environ. Sci. Technol., 43:6888-6894, 2009.
Dumas C., et al., "Marine Microbial Fuel Cell: Use of Stainless Steel Electrodes as Anode and Cathode Materials," Electrochimica Acta, 53:468-473, 2007.
Fan Y., et al., "Enhanced Coulombic Efficiency and Power Density of Air-Cathode Microbial Fuel Cells with an Improved Cell Configuration," J. Power Sources, 171(2):348-354, 2007.
Fan Y., et al., "Quantification of the Internal Resistance Distribution of Microbial Fuel Cells," Environ. Sci. Technol., 42 (21):8101-8107, 2009.
Fang H.H.P., et al, "Phototrophic Hydrogen Production from Acetate and Butyrate in Wastewater," Int. J. Hydrogen Energy, 30:785-793, 2005.
Finkelstein D., et al., "Effect of Electrode Potential on Electrode-Reducing Microbiota," Environ. Sci. Technol., 40:6990-6995, 2006.
Grant P., "Hydrogen Lifts Off—With a Heavy Load," Nature, 424:129-130, 2003.
Gross R., et al., "Progress in Renewable Energy," Environment International, 29:105-122, 2003.
Hasvold Ø., et al., "Sea-water Battery for Subsea Control Systems," Journal of Power Sources, 65:253-261, 1997.
Hasvold Ø., et al., "Electrochemical Power Sources for Unmanned Underwater Vehicles Used in Deep Sea Survey Operations," Journal of Power Sources, 96:252-258, 2001.
Hatzell M., et al., "Comparison of Hydrogen Production and Electrical Power Generation for Energy Capture in Closed-loop Ammonium Bicarbonate Reverse Electrodialysis Systems," Phys. Chem. Chem. Phys., 16:1632-38, 2014.
He Z., et al., "Electricity Generation from Artificial Wastewater Using an Upflow Microbial Fuel Cell," Environ. Sci. Technol., 39:5262-5267, 2005.
He Z., et al., "An Upflow Microbial Fuel Cell with an Interior Cathode: Assessment of the Internal Resistance by Impedance Spectroscopy," Environ. Sci. Technol., 40:5212-5217, 2006.
He Z., et al, "Effect of Electrolyte pH on the Rate of the Anodic and Cathodic Reactions in an Air-Cathode Microbial Fuel Cell," Bioelectrochemistry, 74:78-82, 2008.
Huang C., et al, "Electrodialysis with Bipolar Membranes for Sustainable Development," Environ. Sci. Technol., 40:5233-5243, 2006.
Judd S., et al., "Polarization and Back E.M.F. in Electrodialysis," Journal of Applied Electrochemistry, 23:1117-24, 1993.
Kim H., et al., "A Mediator-less Microbial Fuel Cell Using a Metal Reducing Bacterium, Shewanella putrefaciens," Enzyme and Microbial Technology, 30:145-152, 2002.
Kim J., et al., "Evaluation of Procedures to Acclimate a Microbial Fuel Cell for Electricity Production," Applied Microbiology and Biotechnology, 68:23-30, 2005.
Kim J., et al., "Power Generation Using Different Cation, Anion, and Ultrafiltration Membranes in Microbial Fuel Cells," Environ. Sci. Technol., 41:1004-1009, 2007.
Kim N., et al., "Effect of Initial Carbon Sources on the Performance of Microbial Fuel Cells Containing Proteus vulgaris," Biotechnology and Bioengineering, 70:109-114, 2000.
Kim T., et al., "Systemic Approach for Draw Solute Selection and Optimal System Design for Forward Osmosis Desalination," Desalination, 284:253-60, 2012.
Reimers C.E., et al., "Microbial Fuel Cell Energy from an Ocean Cold Seep," Geobiology, 4:123-136, 2006.
Ren Z., "Characterization of the Cellulolytic and Hydrogen-producing Activities of Six Mesophilic Clostridium Species," Journal of Applied Microbiology, 103:2258-2266, 2007.
Ren Z., "Electricity Production from Cellulose in a Microbial Fuel Cell Using a Defined Binary Culture," Environ. Sci. Technol., 41(13):4781-4786, 2007.
Rezaei F., "Substrate-Enhanced Microbial Fuel Cells for Improved Remote Power Generation from Sediment-Based Systems," Environ. Sci. Technol., 41(11):4053-58, 2007.
Ringeisen B., "A Miniature Microbial Fuel Cell Operating with an Aerobic Anode Chamber," Journal of Power Sources, 165:591-597, 2007.
Rozendal R., et al., "Principle and Perspectives of Hydrogen Production Through Biocatalyzed Electrolysis," Int. J. Hydrogen Energy, 31:1632-1640, 2006.
Selembo P., et al., "The Use of Stainless Steel and Nickel Alloys as Low-Cost Cathodes in Microbial Electrolysis Cells," J. Power Sources, 190:271-278, 2009.
Selembo P., et al., "Hydrogen Production with Nickel Powder Cathode Catalysts in Microbial Electrolysis Cells," International Journal of Hydrogen Energy, 35:428-437, 2010.
Singh R., "Sustainable Fuel Cell Integrated Membrane Desalination Systems," Desalination, 227:14-33, 2008.
Stöhr B., et al., "Enhancement of the Catalytic Activity of Activated Carbons in Oxidation Reactions by Thermal Treatment with Ammonia or Hydrogen Cyanide and Observation of a Superoxide Species as a Possible Intermediate," Carbon, 29(6):707-20, 1991.
Stone M., et al., "An Initial Study of Hexavalent Phosphazene Salts as Draw Solutes in Forward Osmosis," Desalination, 312:130-36, 2013.
Stone M., et al., "Switchable Polarity Solvents as Draw Solutes for Forward Osmosis," Desalination, 312:124-29, 2013.
Sun M., et al., "An MEC-MFC-Coupled System for Biohydrogen Production from Acetate," Environ. Sci. Technol., 42:8095-8100, 2008.
Svitil A., et al., "A Chitin-Binding Domain in a Marine Bacterial Chitinase and Other Microbial Chitinases: Implications for the Ecology and Evolution of 1,4-b-glycanases," Microbiology, 144:1299-1308, 1998.
Tartakovsky B., et al., "Biocatalyzed Hydrogen Production in a Continuous Flow Microbial Fuel Cell with a Gas Phase Cathode," J. Power Sources, 182:291-297, 2008.
Tartakovsky B., et al., "High Rate Membrane-less Microbial Electrolysis Cell for Continuous Hydrogen Production," Int. J. Hydrogen Energy, 34:672-677, 2008.
Tender L., et al., "Harnessing Microbially Generated Power on the Seafloor," Nature Biotechnology, 20:821-825, 2002.
Turek M., et al., "Renewable Energy by Reverse Electrodialysis," Desalination, 205:67-74, 2007.
Veerman J., et al., "Reverse Electrodialysis: A Validated Process Model for Design and Optimization," Chem. Eng. J. (Amsterdam Netherlands), 166:256-268, 2011.
Veerman J., et al., "Reverse Electrodialysis: Comparison of Six Commercial Membrane Pairs on the Thermodynamic Efficiency and Power Density," Journal of Membrane Science, 343:7-15, 2009.

(56) References Cited

OTHER PUBLICATIONS

Veerman J., et al., "Reverse Electrodialysis: Evaluation of Suitable Electrode Systems," J Appl. Electrochem., 40:1461-74, 2010.

Veerman J., et al., "Reverse Electrodialysis: Performance of a Stack with 50 Cells on the Mixing of Sea and River Water," Journal of Membrane Science, 327:136-144, 2009.

Weinstein J.N., et al., "Electric Power from Differences in Salinity: The Dialytic Battery," Science, 191:557-559, 1976.

Wen T., et al., "Spirally Wound Electrodialysis (SpED) Modules," Desalination, 101:79-91, 1995.

Wick G., et al., "Power from Salinity Gradients," Energy, 3:95-100, 1978.

Woodward J., et al., "Enzymatic Production of Biohydrogen," Nature, 405:1014-1015, 2000.

Xing D., et al., "Electricity Generation by Rhodopseudomonas palustris, DX-1," Environ. Sci. Technol., 42 (11):4146-51, 2008.

Yen S., et al., "Study of Draw Solutes Using 2-methylimidazole-Based Compounds in Forward Osmosis," Journal of Membrane Science, 364:242-52, 2010.

Yu E.H., et al., "Microbial Fuel Cell Performance with Non-Pt Cathode Catalysts," J. Power Sources, 17(2):275-281, 2007.

Zhang F., et al., "Power Generation Using an Activated Carbon and Metal Mesh Cathode in a Microbial Fuel Cell," Electrochemistry Communications, 11:2177-79, 2009.

Zhang F., et al., "Microbial Fuel Cell Cathodes With Poly(dimethylsiloxane) Diffusion Layers Constructed Around Stainless Steel Mesh Current Collectors," Environ. Sci. Technol., 44:1490-95, 2010.

Zhuo K., et al, "Activity Coefficients of Individual Ions in Aqueous Solutions of Sodium Halides at 298.15 K," Fluid Phase Equilib., 274:80-84, 2008.

Zuo Y., et al., "Electricity Production from Steam-Exploded Corn Stover Biomass," Energy & Fuels, 20:1716-21, 2006.

Zuo Y., et al., "Tubular Membrane Cathodes for Scalable Power Generation in Microbial Fuel Cells," Environ. Sci. Technol., 41(9):3347-53, 2007.

Zuo Y., et al., "Ion Exchange Membrane Cathodes for Scalable Microbial Fuel Cells," Environ. Sci. Technol., 42 (18):6967-72, 2008.

\* cited by examiner

US 9,546,426 B2

METHODS FOR HYDROGEN GAS PRODUCTION

REFERENCE TO RELATED APPLICATION

This application claims priority from U.S. Provisional Patent Application Ser. No. 61/773,938 filed Mar. 7, 2013, the entire content of which is incorporated herein by reference.

FIELD OF THE INVENTION

Processes and systems described herein relate generally to production of hydrogen gas. In specific aspects of the present invention, reverse electrodialysis processes and systems are provided for generation of hydrogen gas.

BACKGROUND OF THE INVENTION

Development of renewable energy has become increasingly important as concern about carbon-based fuels and impact on the environment grows. There is a continuing need for methods and systems directed to production of hydrogen gas.

SUMMARY OF THE INVENTION

Systems for processes of generating hydrogen gas are provided according to aspects of the present invention which include a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; and a reverse electrodialysis stack comprising a plurality of plurality of alternating anion selective barriers and cation selective barriers disposed between the anode and the cathode defining one or more saline material compartments and one or more lower-saline material compartments.

According to aspects of inventive systems, the plurality of alternating anion selective barriers and cation selective barriers is 1, 2, 3, 4, 5, 6, 7, 8, 9, 10, 11, 12, 13, 14, 15, 16, 17, 18, 19, 20 or a greater number of pairs of alternately disposed anion selective barriers and cation selective barriers.

According to aspects of inventive systems, each anion selective barrier is an anion exchange membrane and each cation selective barrier is a cation exchange membrane.

Systems for processes of generating hydrogen gas are provided according to aspects of the present invention which include a reaction chamber having a wall defining an interior of the reaction chamber and an exterior of the reaction chamber; an anode at least partially contained within an anode compartment of the reaction chamber; an air cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments, wherein oxygen is substantially excluded from the cathode compartment.

Systems for processes of generating hydrogen gas are provided according to aspects of the present invention which include a reaction chamber having a wall defining an interior of the reaction chamber and an exterior of the reaction chamber; an anode at least partially contained within an anode compartment of the reaction chamber; an air cathode at least partially contained within a cathode compartment of the reaction chamber; a gas collection system in gas communication with the cathode compartment for collection of hydrogen or methane gas; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments, wherein oxygen is substantially excluded from the cathode compartment.

Systems for processes of generating hydrogen gas are provided according to aspects of the present invention which further include a conduit for transport of a lower-saline material effluent from the lower-saline material compartment to a container having a first liquid containing portion adjacent a heat source, a vapor condenser portion and a second liquid containing portion for containing condensed vapor; and a conduit for transport of a regenerated lower-saline material from the second liquid containing portion for containing condensed vapor to the lower-saline material compartment.

Systems for processes of generating hydrogen gas are provided according to aspects of the present invention wherein each lower-saline material compartment is in fluid communication with each other lower-saline material compartment and wherein each saline material compartment is in fluid communication with each other saline material compartment.

Systems for processes of generating hydrogen gas are provided according to aspects of the present invention wherein a first reaction chamber is in fluid communication with a second reaction chamber.

Processes for generating hydrogen gas are provided according to aspects of the present invention which include providing a system including a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a saline material having a concentration of dissolved salts into the saline material compartment; and introducing a lower-saline material having a concentration of dissolved salts which is lower than the saline material into the lower-saline material compartment, wherein an electromotive force established by a difference in the concentration of dissolved salts in the saline material compared to the lower-saline material (the saline ratio) drives ions across the first anion selective barrier and first cation selective barrier, thereby increasing the potential between the anode and cathode, decreasing the concentration of dissolved salts in the saline material to generate a saline material effluent, and increasing the concentration of dissolved salts in the lower-saline material to generate a lower-saline material effluent.

Processes for generating hydrogen gas are provided according to aspects of the present invention which include providing a system including a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a saline material having a concentration of dissolved salts into the saline material compartment; and introducing a lower-saline material having a concentration of dissolved salts which is lower than the saline material into the lower-saline material compartment, wherein an electromotive force established by a difference in the concentration of dissolved salts in the saline material compared to the lower-saline material (the saline ratio) drives ions across the first anion selective barrier and first cation selective barrier, wherein the saline ratio between the saline material and the lower-saline material introduced into the saline material compartment and lower-saline material compartment is greater than 1:1, thereby increasing the potential between the anode and cathode, decreasing the concentration of dissolved salts in the saline material to generate a saline material effluent, and increasing the concentration of dissolved salts in the lower-saline material to generate a lower-saline material effluent.

Processes for generating hydrogen gas are provided according to aspects of the present invention which include providing a system including a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; and a reverse electrodialysis stack comprising a plurality of plurality of alternating anion selective barriers and cation selective barriers disposed between the anode and the cathode defining one or more saline material compartments and one or more lower-saline material compartments; introducing a saline material having a concentration of dissolved ammonium bicarbonate into the saline material compartments; and introducing a lower-saline material having a concentration of dissolved ammonium bicarbonate which is lower than the saline material into the lower-saline material compartments, wherein an electromotive force established by a difference in the concentration of dissolved ammonium bicarbonate in the saline material compared to the lower-saline material (the saline ratio) drives ions across the anion-selective barriers and cation-selective barriers, thereby increasing the potential between the anode and cathode, decreasing the concentration of dissolved ammonium bicarbonate in the saline material to generate a saline material effluent, and increasing the concentration of dissolved ammonium bicarbonate in the lower-saline material to generate a lower-saline material effluent.

Processes for generating hydrogen gas are provided according to aspects of the present invention which include providing a system including a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; and a first reverse electrodialysis stack comprising a plurality of plurality of alternating anion selective barriers and cation selective barriers disposed between the anode and the cathode defining one or more saline material compartments and one or more lower-saline material compartments; introducing a saline material having a concentration of dissolved ammonium bicarbonate into the saline material compartment; introducing a lower-saline material having a concentration of dissolved ammonium bicarbonate which is lower than the saline material into the lower-saline material compartment, wherein an electromotive force established by a difference in the concentration of dissolved ammonium bicarbonate in the saline material compared to the lower-saline material (the saline ratio) drives ions across the anion selective barriers and cation selective barriers, thereby increasing the potential between the anode and cathode, decreasing the concentration of dissolved ammonium bicarbonate in the saline material to generate a saline material effluent, and increasing the concentration of dissolved ammonium bicarbonate in the lower-saline material to generate a lower-saline material effluent. The lower-saline material effluent is heated to volatilize and remove the ammonium bicarbonate, thereby producing a regenerated lower-saline material and the regenerated lower-saline material can then be introduced into the lower-saline material compartments. Ammonium bicarbonate is added back to the saline material effluent to produce regenerated saline material and the regenerated saline material can then be introduced into the saline material compartments. Alternatively, or in addition, the saline material effluent can be added to the lower-saline material effluent to dilute it and the resulting material is regenerated lower-saline material which can be introduced into the lower-saline compartments.

Heating the lower-saline material effluent to volatize and remove the thermolytic salt, such as ammonium bicarbonate, according to aspects of the present invention includes heating with waste heat from a second process, heat generated by a solar heater or solar collector or a combination of waste heat from a second process and heat generated by a solar heater or solar collector.

Heating the lower-saline material effluent to volatize and remove the thermolytic salt, such as ammonium bicarbonate, according to aspects of the present invention includes heating to temperature sufficient to volatilize the thermolytic salt and thereby separate it from the solvent, typically water. Heating an aqueous solution including ammonium bicarbonate to a temperature in the range of about 50-90° C. volatilizes the ammonium bicarbonate and thereby separates it from water without substantial vaporization of the water.

Optionally, the lower-saline material effluent and saline material effluent are combined to generate a saline material and the saline material is introduced into the saline material compartment.

In a further option, the saline material comprises one or more dissolved non-thermolytic salts, wherein the total concentration of dissolved thermolytic salt is greater than the total concentration of the one or more dissolved non-thermolytic salts. The dissolved non-thermolytic salt is sodium chloride and/or potassium chloride according to aspects of inventive processes.

According to aspects of the present invention, the system includes a plurality of lower-saline material compartments wherein each lower-saline material compartment is in fluid communication with each other lower-saline material compartment, and a plurality of saline material compartments wherein each saline material compartment is in fluid communication with each other saline material compartment. The saline material flows sequentially through each saline material compartment, the lower-saline material flows sequentially through each lower-saline material compartment, and the saline material and lower-saline material are introduced such that they flow in a counter-current direction or co-current direction with respect to each other.

Optionally, the saline material is a brine solution from a reverse osmosis plant and the lower-saline material is a saline seawater stream.

Processes for generating a hydrogen gas are provided according to the present invention which include introducing a saline material having a concentration of dissolved salts into the saline material compartments of a system including: a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; a plurality of alternating anion-selective barriers and cation-selective barriers disposed between the anode and the cathode and defining alternating saline material compartments and lower-saline material compartments; a first flow path for a saline material through the saline material compartments and a second flow path for a lower-saline material through the lower-saline material compartments, wherein the saline material and the lower-saline material are adjacent and separated by the anion selective barriers and the cation selective barriers; and introducing a lower-saline material having a concentration of dissolved salts which is lower than the saline material into the lower-saline material compartments, wherein an electromotive force established by a difference in the concentration of dissolved salts in the saline material compared to the lower-saline material, drives ions across the plurality of alternating anion-selective barriers and cation-selective barriers disposed between the anode and the cathode, thereby increasing the potential between the anode and cathode, decreasing the concentration of dissolved salts in the saline material to generate a saline material effluent, and increasing the concentration of dissolved salts in the lower-saline material to generate a lower-saline material effluent; heating the lower-saline material effluent to volatilize and remove a dissolved heat regenerable salt, thereby producing a regenerated lower-saline material, or heating the lower-saline material effluent to volatilize and remove water by membrane distillation, thereby producing a regenerated saline material, respectively; and introducing the regenerated lower-saline material into the lower-saline material compartments or introducing the regenerated saline material into the saline material compartments.

Processes for generating a hydrogen gas are provided according to the present invention which include; introducing a saline material having a concentration of dissolved salts into the saline material compartments of a system including: a reaction chamber having a wall defining an interior of the reaction chamber and an exterior of the reaction chamber, an anode at least partially contained within an anode compartment of the reaction chamber, a cathode at least partially contained within a cathode compartment of the reaction chamber, a conductive conduit for electrons in electrical communication with the anode and the cathode, a plurality of alternating anion-selective barriers and cation-selective barriers disposed between the anode and the cathode and defining alternating saline material compartments and lower-saline material compartments, a first flow path for a saline material through the saline material compartments and a second flow path for a lower-saline material through the lower-saline material compartments, wherein the saline material and the lower-saline material are adjacent and separated by the anion selective barriers and the cation selective barriers, a conduit for transport of a lower-saline material effluent from the lower-saline material compartment to a container having a first liquid containing portion adjacent a heat source, a vapor condenser portion and a second liquid containing portion for containing condensed vapor, a conduit for transport of a regenerated lower-saline material from the second liquid containing portion for containing condensed vapor to a lower-saline material compartment; and introducing a lower-saline material having a concentration of dissolved salts which is lower than the saline material into the lower-saline material compartments, wherein an electromotive force established by a difference in the concentration of dissolved salts in the saline material compared to the lower-saline material, drives ions across the plurality of alternating anion-selective barriers and cation-selective barriers disposed between the anode and the cathode, thereby increasing the potential between the anode and cathode, decreasing the concentration of dissolved salts in the saline material to generate a saline material effluent, and increasing the concentration of dissolved salts in the lower-saline material to generate a lower-saline material effluent; heating the lower-saline material effluent to volatilize and remove a dissolved heat regenerable salt, thereby producing a regenerated lower-saline material, or heating the lower-saline material effluent to volatilize and remove water by membrane distillation, thereby producing a regenerated saline material, respectively; and introducing the regenerated lower-saline material into the lower-saline material compartments or introducing the regenerated saline material into the saline material compartments.

Processes for generating a hydrogen gas are provided according to the present invention which include; introducing a saline material having a concentration of dissolved salts into the saline material compartments of a system including: a reaction chamber having a wall defining an interior of the reaction chamber and an exterior of the reaction chamber, an anode at least partially contained within an anode compartment of the reaction chamber, a cathode at least partially contained within a cathode compartment of the reaction chamber, a conductive conduit for electrons in electrical communication with the anode and the cathode, a plurality of alternating anion-selective barriers and cation-selective barriers disposed between the anode and the cathode and defining alternating saline material compartments and lower-saline material compartments, a first flow path for a saline material through the saline material compartments and a second flow path for a lower-saline material through the lower-saline material compartments, wherein the saline material and the lower-saline material are adjacent and separated by the anion selective barriers and the cation selective barriers, a conduit for transport of a lower-saline material effluent from the lower-saline material compartment to a container having a first liquid containing portion adjacent a heat source, a vapor distillation membrane and a second liquid containing portion for containing liquid condensed from vapor which passes through the distillation membrane; and a conduit for transport of a regenerated saline material from the first liquid containing portion to a saline material compartment; introducing a lower-saline material having a concentration of dissolved salts which is lower than the saline material into the lower-saline material compartments, wherein an electromotive force established by a difference in the concentration of dissolved salts in the saline material compared to the lower-saline material, drives ions across the plurality of alternating anion-selective barriers and cation-selective barriers disposed between the anode and the cathode, thereby increasing the potential between the anode and cathode, decreasing the concentration of dissolved salts in the saline material to generate a saline material effluent, and increasing the concentration of dissolved salts in the lower-saline material to generate a lower-saline material effluent; heating the lower-saline material effluent to volatilize and remove a dissolved heat regenerable salt, thereby producing a regenerated lower-saline material, or heating the lower-saline material effluent to volatilize and remove water by membrane distillation, respectively; and introducing the regenerated lower-saline material into the lower-saline material compartments or introducing the regenerated saline material into the saline material compartments.

Processes for generating a hydrogen gas are provided according to the present invention which include introducing a saline material having a concentration of dissolved salts into the saline material compartments of a system including: a reaction chamber having a wall defining an interior of the reaction chamber and an exterior of the reaction chamber, an anode at least partially contained within an anode compartment of the reaction chamber, a cathode at least partially contained within a cathode compartment of the reaction chamber, wherein the cathode compartment contains a catholyte, the catholyte including ammonium bicarbonate and/or ammonium hydroxide, in a concentration in the range of 0.001M-1M, a conductive conduit for electrons in electrical communication with the anode and the cathode, a plurality of alternating anion-selective barriers and cation-selective barriers disposed between the anode and the cathode and defining alternating saline material compartments and lower-saline material compartments, a first flow path for a saline material through the saline material compartments and a second flow path for a lower-saline material through the lower-saline material compartments, wherein the saline material and the lower-saline material are adjacent and separated by the anion selective barriers and the cation selective barriers; and introducing a lower-saline material having a concentration of dissolved salts which is lower than the saline material into the lower-saline material compartments, wherein an electromotive force established by a difference in the concentration of dissolved salts in the saline material compared to the lower-saline material, drives ions across the plurality of alternating anion-selective barriers and cation-selective barriers disposed between the anode and the cathode, thereby increasing the potential between the anode and cathode, decreasing the concentration of dissolved salts in the saline material to generate a saline material effluent, and increasing the concentration of dissolved salts in the lower-saline material to generate a lower-saline material effluent; heating the lower-saline material effluent to volatilize and remove a dissolved heat regenerable salt, thereby producing a regenerated lower-saline material, or heating the lower-saline material effluent to volatilize and remove water by membrane distillation, thereby producing a regenerated saline material, respectively; and introducing the regenerated lower-saline material into the lower-saline material compartments or introducing the regenerated saline material into the saline material compartments.

According to aspects of processes of the present invention, the dissolved heat regenerable salt is selected from the group consisting of: ammonium bicarbonate, ammonium hydroxide and a combination thereof.

According to aspects of processes of the present invention, a saline ratio between the saline material and the lower-saline material introduced into the saline material compartment and lower-saline material compartment is greater than 1:1.

According to aspects of processes of the present invention, the lower-saline material effluent and saline material effluent are combined to generate a saline material and the saline material is introduced into the saline material compartment.

According to aspects of processes of the present invention, the saline material includes a heat regenerable salt. According to aspects of the present invention, the heat regenerable salt is selected from the group consisting of: ammonium bicarbonate, ammonium hydroxide and a combination thereof.

According to aspects of processes of the present invention, the saline material includes one or more dissolved non-heat regenerable salts, wherein the total concentration of dissolved heat regenerable salt is greater than the total concentration of the one or more dissolved non-heat regenerable salts.

According to aspects of processes of the present invention, the heating includes heating with waste heat from a second process, heat generated by a solar heater or solar collector or a combination of waste heat from a second process and heat generated by a solar heater or solar collector.

According to aspects of the present invention, each lower-saline material compartment is in fluid communication with each other lower-saline material compartment, wherein each saline material compartment is in fluid communication with each other saline material compartment.

According to aspects of processes of the present invention, saline material flows sequentially through each saline material compartment, wherein lower-saline material flows sequentially through each lower-saline material compartment, and wherein the saline material and lower-saline material flow in a counter-current direction or co-current direction with respect to each other.

According to aspects of processes of the present invention, the saline material is a brine solution from a reverse osmosis plant and the lower-saline material is a saline seawater stream.

According to aspects of processes of the present invention, the cathode compartment contains a catholyte, the catholyte including a heat regenerable salt.

According to aspects of processes of the present invention, the heat regenerable salt is present in a concentration in the range of 0.001M-1M.

According to aspects of the present invention, the anion-selective barriers are anion exchange membranes and the cation-selective barriers are cation exchange membranes.

According to aspects of the present invention, an anion-selective barrier is disposed adjacent the cathode compartment.

According to aspects of the present invention, the cathode is an air cathode.

According to aspects of the present invention, the system further includes a gas collection system.

According to aspects of the present invention, the plurality of alternating anion selective barriers and cation selective barriers is 1, 2, 3, 4, 5, 6, 7, 8, 9, 10, 11, 12, 13, 14, 15, 16, 17, 18, 19, 20 or a greater number of pairs of alternately disposed anion selective barriers and cation selective barriers.

According to aspects of the present invention, each lower-saline material compartment is in fluid communication with each other lower-saline material compartment and wherein each saline material compartment is in fluid communication with each other saline material compartment.

According to aspects of the present invention, the cathode compartment is a saline material compartment.

According to aspects of the present invention, a bipolar membrane is disposed adjacent the anode compartment.

According to aspects of the present invention, a lower-saline compartment is adjacent the anode compartment.

According to aspects of the present invention, a bipolar membrane disposed adjacent the anode compartment is disposed between the anode compartment and the lower-saline compartment adjacent the anode compartment.

According to aspects of processes of the present invention, an electromotive force established by a difference in the concentration of ammonium bicarbonate in the saline material compared to the lower-saline material drives ions across the first anion selective barrier and first cation selective barrier, thereby increasing the potential between the anode and cathode, decreasing the concentration of dissolved salts in the saline material to generate a saline material effluent, and increasing the concentration of dissolved salts in the lower-saline material to generate a lower-saline material effluent.

Systems for generating a hydrogen gas are provided according to aspects of the present invention which include a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; a plurality of alternating anion-selective barriers and cation-selective barriers disposed between the anode and the cathode and defining alternating saline material compartments and lower-saline material compartments; a first flow path for a saline material through the saline material compartments and a second flow path for a lower-saline material through the lower-saline material compartments, wherein the saline material and the lower-saline material are adjacent and separated by the anion selective barriers and the cation selective barriers; and a bipolar membrane disposed adjacent the anode compartment, a lower-saline compartment adjacent the anode compartment or a bipolar membrane disposed adjacent the anode compartment and disposed between the anode compartment and a lower-saline compartment adjacent the anode compartment.

Systems for generating a hydrogen gas are provided according to aspects of the present invention which include a reaction chamber having a wall defining an interior of the reaction chamber and an exterior of the reaction chamber; an anode at least partially contained within an anode compartment of the reaction chamber; a cathode at least partially contained within a cathode compartment of the reaction chamber; a conductive conduit for electrons in electrical communication with the anode and the cathode; a plurality of alternating anion-selective barriers and cation-selective barriers disposed between the anode and the cathode and defining alternating saline material compartments and lower-saline material compartments; a first flow path for a saline material through the saline material compartments and a second flow path for a lower-saline material through the lower-saline material compartments, wherein the saline material and the lower-saline material are adjacent and separated by the anion selective barriers and the cation selective barriers; a bipolar membrane disposed adjacent the anode compartment, a lower-saline compartment adjacent the anode compartment or a bipolar membrane disposed adjacent the anode compartment and disposed between the anode compartment and a lower-saline compartment adjacent the anode compartment, a conduit for transport of a lower-saline material effluent from the lower-saline material compartment to a container having a first liquid containing portion adjacent a heat source, a vapor condenser portion and a second liquid containing portion for containing condensed vapor, and a conduit for transport of a regenerated lower-saline material from the second liquid containing portion for containing condensed vapor to the lower-saline material compartment.

According to aspects of systems of the present invention, the anion-selective barriers are anion exchange membranes and the cation-selective barriers are cation exchange membranes.

According to aspects of systems of the present invention, an anion-selective barrier is disposed adjacent the cathode compartment.

According to aspects of systems of the present invention, the cathode is an air cathode.

According to aspects of systems of the present invention, the system further includes a gas collection system.

According to aspects of systems of the present invention, the plurality of alternating anion selective barriers and cation selective barriers is 1, 2, 3, 4, 5, 6, 7, 8, 9, 10, 11, 12, 13, 14, 15, 16, 17, 18, 19, 20 or a greater number of pairs of alternately disposed anion selective barriers and cation selective barriers.

According to aspects of systems of the present invention, each lower-saline material compartment is in fluid communication with each other lower-saline material compartment and wherein each saline material compartment is in fluid communication with each other saline material compartment.

According to aspects of systems of the present invention, the cathode compartment is a saline material compartment.

According to aspects of systems of the present invention, a bipolar membrane is disposed adjacent the anode compartment.

According to aspects of systems of the present invention, a lower-saline compartment is disposed adjacent the anode compartment.

According to aspects of systems of the present invention, a bipolar membrane disposed adjacent the anode compartment is disposed between the anode compartment and the lower-saline compartment adjacent the anode compartment.

BRIEF DESCRIPTION OF THE INVENTION

FIG. 1 is a schematic illustration of a repeating subunit of a reverse electrodialysis (RED) system;

FIG. 2 is a schematic illustration of aspects of a system of the present invention including two RED subunits;

FIG. 3 is a schematic illustration of a system of the present invention including two RED subunits;

FIG. 4 illustrates aspects of an inventive system including reaction chamber and an exterior of the reaction chamber;

FIG. 5A is a schematic illustration of the flow path of a saline material and the flow path of a lower-saline material in counter-current configuration;

FIG. 5B is a schematic illustration of the flow path of a saline material and the flow path of a lower-saline material in co-current configuration;

FIG. 5C is a schematic illustration of the flow path of a saline material and the flow path of a lower-saline material in parallel configuration;

FIG. 6 is a schematic illustration of a portion of a RED system; and

FIG. 7 is a schematic diagram illustrating aspects of devices and processes of the present invention.

DETAILED DESCRIPTION OF THE INVENTION

Systems and processes incorporating reverse electrodialysis for generation of hydrogen gas are provided according to the present invention.

Reverse electrodialysis (RED) is a power generation system based on the salinity-driven electromotive force, especially between salty sea water and fresh river water. The concentration difference across the ion-exchange membrane drives the ionic transport in the system, and this driving force can be quantified by Eq. (1) as electromotive force $$|\Delta \phi| = \frac{RT}{zF} \left[ t_{counter} \ln\left( \frac{a_{counter,high}}{a_{counter,low}} \right) - t_{co} \ln\left( \frac{a_{co,high}}{a_{co,low}} \right) \right] \quad (1)$$

where $\Delta\phi$ is the electromotive force driven by the concentration difference, t is the transport number (defined as the fractional contribution of the ionic flux to the current density in the membrane), R is the gas constant, T is the absolute temperature, z is the ionic charge, f is the activity coefficient, and c is the ionic concentration. The subscripts high and low mean the high- and low-concentration cells, respectively. Also, the subscripts counter and co denote the counter- and co-ions to the membrane, respectively. Note that the counter- and co-ions are selected and excluded ions by the ion-exchange membrane; for instance, with a cation-exchange membrane, sodium or magnesium ions are counter-ions, while chloride or sulfate ions are co-ions, and vice versa with an anion-exchange membrane.

The singular terms "a," "an," and "the" used herein are not intended to be limiting and include plural referents unless explicitly state or the context clearly indicates otherwise.

According to aspects, methods and systems provided by the present invention for hydrogen gas production include a RED stack including one or more RED subunits, and use of a saline material including a heat regenerable salt. The salinity driven energy, provided by the one or more RED subunits, completely eliminates the need for an external power source to produce hydrogen gas.

A "heat regenerable salt" is a salt of ions that become volatile gases upon application of heat, allowing separation of the salt from a solvent which is not significantly vaporized under conditions sufficient for volatilization of the salt(s). Such salts are also termed "thermolytic salts."

An example of a heat regenerable salt is ammonium bicarbonate, $NH_4HCO_3$.

A further example of a heat regenerable salt is ammonium hydroxide.

The methods and systems described herein allow generation of hydrogen gas from nearly unlimited energy sources such as organic matter in solution, for example in domestic and industrial wastewaters, and seawater and river water.

In the RED stack, ions present in a saline material are driven by concentration difference across ion-selective barriers present in the system separating the ions from the saline material into a lower-saline material. Thus, anions move away from a saline material through an anion-selective barrier, such as an anion exchange membrane (AEM) into a lower-saline material and cations move away from a saline material through a cation-selective barrier, such as a cation exchange membrane (CEM) into a lower-saline material.

FIG. 1 is a schematic illustration of a repeating subunit of a RED system including a cation-selective barrier 10, such as a cation exchange membrane, adjacent a saline material compartment 30 and a lower saline material compartment 40, and an anion-selective barrier 20, such as an anion-exchange membrane, adjacent a saline material compartment 30 and a lower saline material compartment 40.

The term "anion-selective barrier" is used herein to refer to a material which allows passage of anions but which does not substantially allow passage of other materials. A well-known example is an anion-exchange membrane.

The term "cation-selective barrier" is used herein to refer to a material which allows passage of cations but which does not substantially allow passage of other materials. A well-known example is a cation-exchange membrane.

In operation, anions pass from a saline material compartment 30 through an anion exchange material 20, to reach a lower saline material compartment 40. Cations pass from a saline material compartment 30 through a cation-selective barrier 10, to reach a lower saline material compartment 40.

Aspects of systems of the present invention include multiple subunits of a RED system having alternately placed cation-selective barriers, such as cation exchange membranes 10, and anion-selective barriers, such as anion-exchange membranes 20, between saline-material compartments 30 for high-salt concentration fluids, referred to as "saline materials" herein and lower saline material compartments 40 for low-salt concentration fluids, referred to as "lower-saline materials" herein.

One or more flow pathways for a saline material is present for the flow of the saline material through one or more of the saline material compartments. One or more flow pathways for a lower-saline material is present for the flow of the lower-saline material through one or more of the lower-saline material compartments.

FIG. 2 is a schematic illustration of aspects of a system of the present invention including two RED subunits. The system of the present invention schematically illustrated in FIG. 2 includes reaction chamber 50 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is not shown in this schematic illustration. Alternately placed cation-exchange membranes 10 and anion-exchange membranes 20 between saline-material compartments 30 and lower saline material compartments 40 such that a saline-material compartment 30 and an adjacent lower saline material compartment 40 are in ion communication. An optional anion exchange membrane 25 is disposed adjacent the anode chamber such that the anode chamber is in ion communication with the adjacent saline-material compartment or lower saline material compartment.

The open circuit potential of a system of the present invention can be theoretically calculated. For instance, with 0.6 M and 0.03 M NaCl solutions in the saline material compartment and lower-saline material compartment, the salinity driven electromotive force is 0.3 V (for the calculation, assumed conditions of 25° C.; transport number of the counter-ion 0.95, with activity coefficients determined by the Extended Debye-Huckel model). Assuming that the anode open circuit potential is −0.3 V (vs. NHE) and the air cathode open circuit potential is 0.4 V (vs. NHE) (Logan, 2008), the total open circuit potential of the reactor is 1.0 V.

Due to the ionic transport through the ion-exchange membrane, the concentration difference between the high- and low-concentration cells reduces with the system operation. To avoid this reduction in the concentration difference, the solution in the reactor should be replaced. Thus, embodiments of the present invention include one or more pumps to deliver the saline material and lower-saline material to the corresponding saline material and lower-saline material compartments of the reactor.

FIG. 3 is a schematic illustration of a system of the present invention including two RED subunits.

A system of the present invention schematically illustrated in FIG. 3 includes reaction chamber 90 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is not shown in this schematic illustration. Alternately placed cation-exchange membranes 10 and anion-exchange membranes 20 between saline-material compartments 30 and lower saline material compartments 40 such that a saline-material compartment 30 and an adjacent lower saline material compartment 40 are in ion communication. An optional anion exchange membrane 25 is disposed adjacent the anode chamber such that the anode chamber is in ion communication with the adjacent saline-material compartment or lower saline material compartment.

A system of the present invention includes an RED system having one or more subunits, each subunit having an anion-selective barrier and a cation-selective barrier which together define a saline material compartment between the anion selective barrier and the cation-selective barrier. The first anion-selective barrier of an RED subunit is disposed between the saline material compartment and a lower-saline material compartment such that anions traverse the first anion-selective barrier down a concentration gradient to reach a lower-saline material, producing a voltage. The first cation-selective barrier is disposed between the saline material and a lower-saline material compartment such that cations traverse the first cation-selective barrier to reach a lower-saline material, producing a voltage.

In addition to the one or more subunits, an RED system optionally includes an anion-selective barrier disposed between the cation-selective barrier of an RED subunit closest to the anode and the anode, defining an anode compartment. Thus, the anode compartment is optionally and preferably a lower-saline material compartment and the adjacent compartment is preferably a saline material compartment.

The catholyte in the cathode compartment can be regularly replaced or continuously pumped to avoid extremely high pH in the cathode compartment if desired.

Optionally, the catholyte includes ammonium bicarbonate. The ammonium bicarbonate is typically present in a concentration in the range of 0.001M-1 M, inclusive, such as in the range of 0.01M-0.5M, inclusive, or in the range of 0.05M-0.25M, inclusive.

In FIGS. 2 and 3, anion-selective barrier 25 is an anion-selective barrier disposed between the cation-selective barrier 20 of an RED subunit closest to the anode and the anode 70, defining a cathode compartment 75.

In an embodiment including only a single RED subunit, the anion selective barrier of the RED subunit defines the anode compartment which is also a lower-saline material compartment, the anion selective barrier and the cation selective barrier define a saline material compartment between the anion selective barrier and the cation selective barrier, and an anion selective barrier is disposed between the cation selective barrier of the RED subunit and the cathode, defining a cathode compartment which is also a saline material compartment.

In a "stack" configuration of an RED, the anion-selective and cation-selective barriers are generally parallel. As illustrated, anion-selective and cation-selective barriers are preferably anion-selective membranes, such as anion-exchange membranes and cation-selective membranes, such as cation-exchange membranes, respectively.

The number of subunits included in the RED system is not limited, is preferably in the range of 1-20 subunits, inclusive, but may be greater. According to embodiments, a small number of RED subunits, in the range of 1-10, inclusive, coupled with an optimized flow scheme, minimizes energy losses due to pumping solutions.

Embodiments of systems according to the present invention include a reaction chamber having a wall defining an interior of the reaction compartment and an exterior of the reaction compartment; an anode at least partially contained within an anode compartment of the reaction compartment; and a cathode at least partially contained within a cathode compartment of the reaction compartment, a conductive conduit for electrons in electrical communication with the anode and cathode, and a reverse electrodialysis system (RED) interposed between the anode and cathode.

A schematic illustration of aspects of devices of the present invention is shown in FIG. 4. FIG. 4 illustrates aspects of an inventive system including reaction chamber 100 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is shown at 52 along with a load and/or optional power supply 54. Alternately placed cation-exchange barriers 10 and anion-exchange barriers 20 between saline-material compartments 30 and lower saline material compartments 40. An anion-selective barrier 25 is disposed anion-selective barrier disposed between the cation-selective barrier 20 of an RED subunit closest to the anode and the anode 70, defining an anode compartment 75. One or more channels for inlet and outlet of materials, such as gases, catholyte, saline material or lower saline material can be included, examples are shown at 91, 92, 93, 94, 95, 96, 97 and 98. A bipolar membrane 99 is shown adjacent the anode compartment. A lower-saline material compartment 40 is shown adjacent the anode compartment.

Methods of the present invention include the movement of ions from a "saline material" concentrated in the ions down a concentration gradient to a "lower-saline material" less concentrated in the ions. The term "saline material" refers to aqueous mixtures including dissolved salts such as halides, carbonates, bicarbonates, phosphates and sulfates of sodium, potassium, calcium, lithium, magnesium, ammonium, zinc or copper. A saline material is an aqueous solution that includes more than 50% ammonium bicarbonate, by weight, according to embodiments of the present invention. Saline materials include brackish water, saline water, and brine. The term "lower saline material" refers to aqueous fluids which may or may not contain dissolved salts but which contain a lower concentration of dissolved salts than a reference saline material. Fresh water is a lower-saline material. However, as will be appreciated, the terms saline material and lower-saline material are relative and it is sufficient that the saline material used be higher in concentration of dissolved salts initially than the lower-saline material such that a concentration gradient is present which allows for spontaneous movement of the dissolved salts from the saline material across the ion selective barriers to the lower-saline material. The term "fresh water" refers to water having less than 0.5 parts per thousand dissolved salts. The term "brackish water" refers to water having 0.5-30 parts per thousand dissolved salts. The term "saline water" refers to water having greater than 30-50 parts per thousand dissolved salts. The term brine refers to water having greater than 50 parts per thousand dissolved salts.

An electromotive force established by a difference in the concentration of dissolved salts in the saline material compared to the lower-saline material (the saline ratio) drives ions across an anion selective barrier and a cation selective barrier, thereby increasing the potential between the anode and cathode. The saline ratio between the saline material and the lower-saline material introduced into the saline material compartment and lower-saline material compartment is greater than 1:1.

One or more supports, gaskets, spacers and/or seals may be used to inhibit movement of fluids between adjacent compartments of systems of the present invention and to provide structural support for the RED subunits.

Embodiments of systems of the present invention are configured such that saline material and lower-saline material are introduced in batches or as a continual flow. Saline materials and lower-saline materials can be introduced and subsequently removed when the difference in concentration of dissolved salts between the saline material and lower-saline material has been reduced, i.e. the reactor can be operated in batch mode. Alternatively, saline material and/or lower-saline material can continuously flow into the respective saline material compartments and lower-saline material compartments.

One or more channels for inlet and outlet of materials, such as gases, saline material and lower-saline material can be included for continual flow or batch operation of devices of the present invention.

For continual flow operation, flow paths of the saline material and lower-saline material compartments can be co-current, i.e. in the same direction, or counter-current, i.e. in opposite directions.

In FIGS. 5A, 5B and 5C, the five RED subunits and the cathode protective anion-selective barrier included in the RED system shown in FIG. 4 are shown in isolation from the reaction chamber are shown to illustrate flow paths of the saline material or lower-saline materials through saline material compartments or lower-saline material compartments, respectively.

FIG. 5A is a schematic illustration of the flow path of a saline material 110 and the flow path of a lower-saline material 112 in counter-current configuration through saline material compartments or lower-saline material compartments, respectively. Alternately placed cation-exchange membranes 10 and anion-exchange membranes 20 between saline-material compartments 30 and lower saline material compartments 40 are shown along with anion-exchange membrane 25.

FIG. 5B is a schematic illustration of the flow path of a saline material 110 and the flow path of a lower-saline material 112 in co-current configuration through saline material compartments or lower-saline material compartments, respectively. Alternately placed cation-exchange membranes 10 and anion-exchange membranes 20 between saline-material compartments 30 and lower saline material compartments 40 are shown along with anion-exchange membrane 25.

FIG. 5C is a schematic illustration of the flow path of a saline material 110 and the flow path of a lower-saline material 112 in parallel configuration through saline material compartments or lower-saline material compartments, respectively. Alternately placed cation-exchange membranes 10 and anion-exchange membranes 20 between saline-material compartments 30 and lower saline material compartments 40 are shown along with anion-selective membrane 25.

Each individual saline material or lower-saline material compartment can have an inlet and/or outlet for the flow of material into the compartment. Systems of the present invention optionally include a flow path for saline material which is continuous through two or more saline material compartments and further optionally include a flow path for lower-saline material which is continuous through two or more lower-saline material compartments.

FIG. 6 is a schematic illustration of a portion of a RED system and shows two cation-selective barriers 10, an anion-selective barrier 20, and gaskets 22. Channels 24 in the barriers and gaskets allow for directed flow of saline material or lower saline material along a selected flow path, 26. As will be appreciated by the skilled artisan, the flow path shown in FIG. 6 is exemplary and other flow paths are encompassed by the present invention.

Embodiments of inventive devices include spiral wound ion selective barrier pairs. In a "spiral wound" configuration, an inventive device is generally cylindrical in shape and includes at least one anode, at least one cathode, at least one ion selective barrier pair having a spacer disposed between the anion selective barrier and the cation selective barrier of each ion selective barrier pair and a cathode protective anion selective barrier. One of the electrodes, the inner electrode, is disposed in an inner position and the at least one ion selective barrier pair is wound radially with respect to the inner electrode. A second electrode, the outer electrode, is disposed in an outer position such that the at least one ion selective barrier pair is between the inner electrode and the outer electrode and the cathode protective anion selective barrier is adjacent the cathode. Each ion selective barrier pair defines a saline material compartment disposed therebetween. One or more seals can be used to inhibit fluid leakage between adjacent compartments.

The volumes of the compartments can be varied to suit specific needs that vary depending on, for example, concentration of dissolved salts, organic loading and current densities.

Advantageously, the rate of power or hydrogen production in a system of the present invention can be controlled by setting the flow rate of the saline material and the lower-saline material. Further, a system of the present invention is operated anaerobically such that aeration of the water is avoided if dissolved oxygen is used at the cathode for reduction. If a chemical catholyte, such as ferricyanide, is used then it would have to be regenerated and desalinated.

As will be appreciated, as ionic transport occurs through the ion-exchange membranes between saline material compartments and lower-saline material compartments, the salt concentration difference between the saline material compartments and lower-saline material compartments, reduces with operation of the system. To avoid reduction in current output and/or hydrogen generation, the lower saline material and/or saline material is replaced, either in batch mode or by continual flow, such as by an external pumping system of the saline material and/or lower saline material into the corresponding compartments (influent materials) and removal of the effluent.

As an example, where the saline material and lower-saline material are pumped to flow from the influent reservoirs, through the reactor, and eventually to the respective effluent reservoirs.

Thus according to embodiments of the present invention, an included saline material is an aqueous solution that includes ammonium bicarbonate at or below its solubility limit, which is known to be 2.7 M, but in practice approximately 1.8 M. Experimental results with a device of the present invention confirmed that the saline material concentration can be as low as 0.1 M for stable operation of the system, while optimum concentration was found to be 0.9 M or higher for the saline material. A corresponding lower-saline material used has much less than this concentration of ammonium bicarbonate than that in the saline material used as the lower salinity solution, ranging from that of pure water to half that of the ammonium bicarbonate concentration used, while optimum concentration for the lower-saline material is one fiftieth of the saline material or smaller. Ammonium bicarbonate is volatilized at a temperature in the range of about 50° C.-95° C., such as 60° C.-90° C., without substantial vaporization of water in the aqueous solution, thereby separating the salt from the solvent.

During operation, saline material partially depleted of dissolved salts, or now in equilibrium with the non-saline solution, referred to as saline material effluent, is removed. Similarly, as ions move into the lower-saline material compartment, the amounts of dissolved salts increases and the resulting material, referred to as lower-saline material effluent, is removed. Removal can be achieved by continuous flow or by removal in batch mode.

In operation of a system of the present invention in which the saline material is an aqueous solution that includes ammonium bicarbonate, $NH_4^+$ and $HCO_3^-$ ions cross the corresponding ion exchange barrier into a lower-saline material compartment. Upon removal of the effluent from the lower-saline material compartments, the effluent is heated. Upon application of heat to the effluent containing the $NH_4^+$ and $HCO_3^-$ ions, ammonia and carbon dioxide gases are evolved from the effluent and can be captured and condensed back into water. The effluent is thereby regenerated as a lower-saline material by removal of the ammonium bicarbonate and the regenerated lower-saline material can be reintroduced into lower-saline material compartments.

Alternatively, or in addition, the saline material effluent can be added to the lower-saline material effluent to dilute it and the resulting material is regenerated lower-saline material which can be introduced into the lower-saline compartments. Optionally, the saline material effluent is heated to volatilize and remove ammonium bicarbonate.

The heat used to increase the temperature of the effluent to evolve the gases can be waste heat from any reaction or process. Thus, processes and systems according to such embodiments allow for capture of waste heat energy through regeneration of the lower-saline material. Alternatively, the heat used can be drawn from conventional sources. In a further alternative, the heat can be generated by a secondary process such as from water in solar energy cells.

In a further aspect, in operation of a system of the present invention in which the saline material is a dissolved non-thermolytic salt, ions cross the corresponding ion exchange barrier into a lower-saline material compartment. Upon removal of the effluent from the lower-saline material compartments, the effluent is heated in a first container separated from a second container by a membrane in a process of membrane distillation. Upon application of heat to the effluent containing the dissolved non-thermolytic salt, water vapor is evolved from the effluent, passes through the membrane and is then captured and condensed back into water in a second container. The effluent is thereby regenerated as a saline material by removal of the water and the regenerated saline material can be reintroduced into saline material compartments.

Alternatively, or in addition, the lower-saline material effluent can be added to the saline material effluent to dilute it and the resulting material is regenerated lower-saline material which can be introduced into the lower-saline compartments.

The heat used to increase the temperature of the effluent to evolve the water can be waste heat from any reaction or process. Thus, processes and systems according to such embodiments allow for capture of waste heat energy through regeneration of the saline and lower-saline materials. Alternatively, the heat used can be drawn from conventional sources. In a further alternative, the heat can be generated by a secondary process such as from water in solar energy cells.

Optionally, the saline material effluent and lower-saline material effluent are combined after removal from the respective compartments to regenerate a saline material which may be returned to the saline material compartment for re-use or discarded.

In a further option, one or more salts other than ammonium bicarbonate is present in the lower-saline material to minimize resistive loss in the RED subunit and/or stack. In such embodiments, the concentration of the additional salt or salts is less than the concentration of ammonium bicarbonate. The one or more additional salts are non-volatile such that no loss of the non-volatile salt occurs during the heating process to regenerate the lower-saline material. Preferably such additional salts do not form scale during the heating process such that the non-volatile salts are not lost during the heating process. An example of an additional include salt is potassium chloride FIG. 7 is a schematic diagram illustrating aspects of devices and processes of the present invention where one or both effluents circulated through the RED stack are regenerated in one or more distillation columns into a saline material (regenerated concentrate solution) and a lower-saline material (regenerated dilute solution). Here the anode and cathode solutions are shown as once-through, but they can be recycled. A device according to aspects of the present invention is shown, including reaction chamber 200 having a wall 60 defining an interior of the reaction chamber and an exterior of the reaction chamber. An anode 70 at least partially contained within an anode compartment of the reaction chamber 75 is shown along with a cathode 80 at least partially contained within a cathode compartment 85 of the reaction chamber. A conductive conduit for electrons in electrical communication with the anode and the cathode is shown at 52 along with a load and/or optional power supply 54. Alternately placed cation-exchange barriers 10 and anion-exchange barriers 20 define saline-material compartments 30 and lower saline material compartments 40 between the anode 70 and cathode 80. An anion-selective barrier 25 is an anion-selective barrier disposed between the cation-selective barrier 10 of an RED subunit closest to the anode and the anode 70, defining a cathode compartment 75. One or more channels for inlet and outlet of materials, such as gases, saline material or lower saline material can be included, examples are shown at 91, 92, 93, 94, 95, 96, 97 and 98. Schematically shown are flow pathways for an anode solution, cathode solution, saline material and lower-saline material. Lower-saline material inlet flow path 203 is shown entering through inlet 97 a lower-saline material compartment 40 which is in liquid flow communication with each other lower-saline material compartment 40. The lower-saline material effluent exits through outlet 95 by lower-saline material effluent flow path 201 to reach distillation column 202. Heat for volatilization of ammonium bicarbonate in the lower-saline material effluent may be derived from a waste heat process and/or heat exchanger.

Saline material inlet flow path 206 is shown entering through inlet 96 a lower-saline material compartment 30 which is in liquid flow communication with each other saline material compartment 30.

Optionally, the saline material effluent exits through outlet 98 by saline material effluent flow path 204 to reach distillation column 205. Heat used to heat the saline material effluent may be derived from a waste heat process and/or heat exchanger. Salt may be added to the saline material effluent to regenerate the saline material. The salt may be collected from the volatilized/condensed ammonium bicarbonate from distillation column 202 or from another source. Alternatively, some of the water in the saline material effluent may be vaporized and removed to concentrate the salt therein. In a further alternative, the saline material effluent is combined with the lower-saline material effluent to dilute it and produce a regenerated lower-saline material.

Saline material 207 recovered from the lower-saline effluent may be added to the saline material flow path 206. Lower-saline material 208 which may be recovered from the saline material effluent can be added to the lower-saline material flow path 203.

According to aspects of the present invention, the device includes a bipolar membrane disposed adjacent the anode. A bipolar membrane is made by laminating an anion-exchange and a cation-exchange membrane. At the interface between the anion-exchange and cation-exchange membranes, water is split into protons and hydroxyl ions. Protons are transferred through the section of the cation-exchange membrane, while hydroxyl ions are driven toward the anode. As a result, the bipolar membrane can be used as a barrier against ammonia cross-over. This minimizes accumulation of ammonia and loss of the salt solution in the anode chamber.

According to aspects of the present invention, the device includes a saline material compartment disposed adjacent the anode. While a saline material compartment is located next to the anode chamber as shown in FIG. 3, the RED stack can also be designed with a lower-saline material compartment next to the anode chamber. This RED design minimizes accumulation of ammonia and loss of the salt solution in the anode chamber.

In a further option, a non-ammonium based salt solution, such as sodium bicarbonate is present in the compartment adjacent to the anode. This RED design minimizes accumulation of ammonia and loss of the salt solution in the anode chamber. This stream of non-ammonium based salt solution, such as sodium bicarbonate, may be kept separate from the other stack solutions, i.e. the saline material and the lower-saline material.

In a further option, the saline material first flows through the cathode chamber and then into the one or more saline material compartments. This may help to better maintain pH in the cathode chamber.

In a further option, a sodium bicarbonate solution is present in the cathode chamber.

Optionally, wastewater is the lower-saline material introduced into the anode chamber. In a further option, wastewater or treated wastewater is the lower-saline material introduced into the lower-saline material chamber.

Organic matter may be added to the anode chamber.

Electrodes Generally

Electrodes included in a system according to the present invention are electrically conductive. Exemplary conductive electrode materials include, but are not limited to, carbon paper, carbon cloth, carbon felt, carbon wool, carbon foam, carbon mesh, activated carbon, graphite, porous graphite, graphite powder, graphite granules, graphite fiber, a conductive polymer, a conductive metal, and combinations of any of these. A more electrically conductive material, such as a metal mesh or screen can be pressed against these materials or incorporated into their structure, in order to increase overall electrical conductivity of the electrode.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 90 degrees with respect to the longest dimension of the cathode.

Electrodes of various sizes and shapes may be included in an inventive system. For example, tubular electrodes can be used as described in Logan, B. E., et al., Environmental Science & Technology 41, 3341-3346 (2007), where the water to be treated flows around tubes containing the water that will contain the higher concentrations of salts (or vice versa). Electrodes can be placed in a co-cylindrical arrangement, or they can be wound as flat sheets into a spiral membrane device.

In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes.

In preferred embodiments, the electrodes are closely spaced to maximize performance of the system, so the compartment width for the saline material compartments and lower-saline material compartments can be very thin, such as, but not limited to, 0.05-10 millimeters, inclusive, more preferably in the range of 0.1-5 millimeters, inclusive, and still more preferably in the range of 0.3-2 millimeters inclusive.

In further examples, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor. The ratio of the total surface area of the one or more anodes to the total volume of the interior of the reaction chamber is in the range of about 10000:1-1:1, inclusive, square meters per cubic meter in particular embodiments. In further embodiments, the ratio is in the range of about 5000:1-100:1.

Specific surface area of an electrode included in a system is greater than 100 $m^2/m^3$ according to embodiments of the present invention. Specific surface area is here described as the total surface area of the electrode per unit of electrode volume. Specific surface areas greater than 100 $m^2/m^3$ contribute to power generation in a system according to embodiments of the present invention. In further embodiments, systems according to the present invention include an electrode having a specific surface area greater than 1000 $m^2/m^3$. In still further embodiments, systems according to the present invention include an electrode having a specific surface area greater than 5,000 $m^2/m^3$. In yet further embodiments systems according to the present invention include an electrode having a specific surface area greater than 10,000 $m^2/m^3$. An electrode configured to have a high specific surface area allows for scaling of systems according to the present invention.

A high specific surface area electrode is configured as a mesh of carbon-based material or a brush in particular embodiments.

Anodes

An anode included in embodiments of systems according to the present invention includes fibers of a conductive anode material. Exemplary conductive electrode materials include, but are not limited to, carbon paper, carbon cloth, carbon felt, carbon wool, carbon foam, carbon mesh, activated carbon, graphite, porous graphite, graphite powder, graphite granules, graphite fiber, a conductive polymer, a conductive metal, and combinations of any of these. A more electrically conductive material, such as a metal mesh or screen can be pressed against these materials or incorporated into their structure, in order to increase overall electrical conductivity of the electrode.

Specific surface area of an anode included in systems is greater than 100 $m^2/m^3$ according to embodiments of the present invention. Specific surface area is here described as the total surface area of the anode per unit of anode volume. Specific surface areas greater than 100 $m^2/m^3$ contribute to power generation in systems according to embodiments of the present invention. In further embodiments, systems according to the present invention include an anode having a specific surface area greater than 1000 $m^2/m^3$. In still further embodiments, systems according to the present invention include an anode having a specific surface area greater than 5,000 $m^2/m^3$. In yet further embodiments, systems according to the present invention include an anode having a specific surface area greater than 10,000 $m^2/m^3$. An anode configured to have a high specific surface area allows for scaling of systems according to the present invention.

A high specific surface area anode is configured as a mesh of carbon-based material in particular embodiments.

A brush anode is provided in particular embodiments which has a specific surface area greater than 100 $m^2/m^3$. A brush anode includes one or more conductive fibers. In particular embodiments the one or more fibers are attached to a support.

A plurality of fibers is attached to the support and the fibers extend generally radially from the support in specific embodiments. A brush anode optionally includes a centrally disposed support having a longitudinal axis.

Brush anodes include a variety of configurations illustratively including various twisted wire brush configurations and strip brush configurations. For example, a particular twisted wire brush configuration includes a support formed from two or more strands of wire and fibers attached between the wires. In a further example, a strip brush configuration includes fibers attached to a conductive backing strip, the strip attached to the support.

Fibers of a brush anode are electrically conductive and are in electrical communication with the support and with a cathode.

In particular embodiments, fibers of a brush anode include a metallic and/or non-metallic conductive material. In a specific example, fibers include carbon fibers. Carbon fibers are optionally substantially composed of graphite. In a further option, a carbon material is mixed with a conductive polymer to form a fiber. In still further embodiments, a polymer fiber is coated with a conductive carbon material.

In particular embodiments, fibers of a brush anode are titanium or substantially titanium.

The carbon fibers or other carbon material may be heated in order to remove compounds that can interfere with power generation. Carbon mesh active surface area and charge transfer coefficient can be measured to determine the optimal time and temperature for heat treatment to reduce compounds that can interfere with power generation. In one example, heating the carbon fibers or other carbon material to 450° C. for 30 minutes removes material that can interfere with power generation.

A brush anode electrode may include any of various coatings. For example, a brush anode electrode may be coated with a material which increases the conductivity of electrons. Examples of materials which increase the conductivity of electrons include, but are not limited to, neutral red, $Mn^{4+}$, $Fe_3O_4$, $Ni2^+$, fluorinated polyanilines, such as poly(2-fluoroaniline) and poly(2,3,5,6-tetrafluoroaniline) for example, anthraquinone-1,6-disolfonic acid (AQDS), 1,4-naphthoquinone (NQ), and combinations of any of these.

In a particular embodiment, an anode is treated with an ammonia gas process to increase power production and reduce the time needed to generate substantial power once the reactor is inoculated. For example, a brush anode is treated with a heated ammonia gas, such as $NH_3$ gas. In a specific embodiment, a brush anode is heated to 700° C. and incubated with $NH_3$ gas for about one hour.

Additional materials are optionally included in a brush anode, for example to strengthen and support the graphite fibers or to help clean the system.

Cathodes

A cathode included in systems according to embodiments of the present invention may be configured to be immersed in liquid or as a gas cathode, having a surface exposed to a gas. A cathode preferably includes an electron conductive material. Materials included in a cathode included in an inventive system illustratively include, but are not limited to, carbon paper, carbon cloth, carbon felt, carbon wool, carbon foam, graphite, porous graphite, graphite powder, activated carbon, a conductive polymer, a conductive metal, and combinations of any of these.

In particular embodiments, a cathode included in systems of the present invention is an air cathode, also known as a gas cathode.

Optionally, the cathode includes a membrane and the membrane forms a cathode wall. The cathode wall has an external surface and an internal surface and the wall defines an interior space adjacent to the internal surface and an exterior adjacent to the external surface. The cathode wall forms a shape which is generally cylindrical in particular embodiments. In further particular embodiments, the shape formed by the cathode wall is generally slab or brick-shaped, having a hollow interior. Other hollow shapes are also possible, illustratively including hollow disc-shaped.

A membrane forming a cathode wall is a porous membrane. The membrane is sufficiently porous to allow diffusion of a desired material through the membrane. For example, an included membrane is porous to oxygen, protons and/or hydrogen gas in particular embodiments of an inventive microbial fuel cell. In specific embodiments of a hydrogen generating system, an included membrane is porous to protons where a catalyst is present on or adjacent to the internal surface of the membrane. In further specific embodiments of a hydrogen gas generating system, an included membrane is porous to protons and hydrogen gas where a catalyst is present on or adjacent to the external surface of the membrane. In preferred embodiments, the effective pores of an included membrane are smaller than the size of a typical bacterium, about 1000 nanometers. Thus, the flow of water and/or bacteria through the membrane and any included membrane coatings is restricted.

A membrane included in a cathode of the present invention is not limited as to the material included in the membrane. Microfiltration, nanofiltration and ion exchange membrane compositions are known in the art and any of various membranes may be used which exclude bacteria and allow diffusion of a desired gas through the membrane. Illustrative examples of microfiltration, nanofiltration and/or ion exchange membrane compositions include, but are not limited to, halogenated compounds such as tetrafluoroethylene, tetrafluoroethylene copolymers, tetrafluoroethylene-perfluoroalkylvinylether copolymers, polyvinylidene fluoride, polyvinylidene fluoride copolymers, polyvinyl chloride, polyvinyl chloride copolymers; polyolefins such as polyethylene, polypropylene and polybutene; polyamides such as nylons; sulfones such as polysulfones and polyether sulfones; nitrile-based polymers such as acrylonitriles; and styrene-based polymers such as polystyrenes.

A membrane optionally includes a structural support layer such as a porous plastic backing layer. For example, a membrane is optionally supported on a polyester layer. A support layer is flexible in preferred embodiments.

Examples of suitable membrane materials are ultrafiltration and nanofiltration membranes commonly employed in the water treatment industry to filter water while excluding bacteria. For example, a suitable membrane is ultrafiltration membrane B 0125 made by X-Flow, The Netherlands. Additional examples include CMI and AMI ion exchange membranes made by Membranes International, Inc. New Jersey, USA.

A membrane included in an inventive cathode includes a conductive material such that the membrane is electrically conductive and/or the membrane is coated on one side with a conductive material.

In particular configurations, one or more coatings are applied to the membrane in order to allow the material to become electrically conductive. For example, a metal or carbon containing coating is optionally applied to at least a portion of one side of the membrane. In a particular embodiment, a graphite coating is applied. An exemplary formulation of a graphite coating includes products of Superior Graphite, formulations ELC E34, Surecoat 1530.

Optionally, a membrane material is fabricated to include an electrically conductive material in the membrane, rendering a membrane made from the material electrically conductive. For example, carbon fibers may be mixed with a polymer typically used in an ultrafiltration, nanofiltration and/or ion exchange membrane.

Optionally, a catalyst for enhancing a desired reaction at the cathode is included in a cathode according to the present invention. A catalyst for enhancing reduction of protons to hydrogen gas, that is enhancing a hydrogen evolution reaction, is optionally included in a hydrogen gas producing system of the present invention. An included catalyst typically enhances the reaction kinetics, e.g. increases the rate of oxygen and/or proton reduction. In addition, a catalyst reduces a need for applied potential, the overpotential, for initiating oxygen and/or hydrogen reduction.

A catalyst is optionally applied to a conductive membrane. In a further option, a catalyst is mixed with a conductive material to form a mixture which is applied to a membrane. In a further option, a catalyst is applied to the membrane before or after application of a conductive material.

In particular embodiments, a catalyst is optionally mixed with a polymer and a conductive material such that a membrane includes a conductive catalyst material integral with the membrane. For example, a catalyst, is mixed with a graphite coating material and the mixture is applied to a cathode membrane.

Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production. In further embodiments, an included catalyst is, or includes, a non-noble metal containing catalyst such as CoTMPP and/or activated carbon. In embodiments of inventive systems, the catalyst is, or includes, molybdenum disulfide.

One or more additional coatings may be placed on one or more electrode surfaces. Such additional coatings may be added to act as diffusion layers, for example. A cathode protective layer, for instance, may be added to prevent contact of bacteria or other materials with the cathode surface while allowing oxygen diffusion to the catalyst and conductive matrix. In further embodiments, a cathode protective layer is included as a support for bacterial colonization such that bacteria scavenge oxygen in the vicinity of the cathode but do not directly contact the cathode.

A tube cathode included in systems according to embodiments of the present invention is open at one or both ends of its length to an oxygen-containing medium. In particular embodiments, a tube cathode included in systems is open at one or both ends to ambient air.

A tube cathode included in systems according to embodiments of the present invention is open at one end of its length to a receptacle or conduit for collection or passage of generated hydrogen gas.

As described above, a tube cathode according to the present invention has an interior space. The interior space of a tube cathode included in a microbial fuel cell configured for hydrogen generation according to embodiments of the present invention may be gas filled in one option. Thus, for example, the interior space of a tube cathode may initially contain ambient air at start-up and contain increased amounts of hydrogen as hydrogen generation proceeds during operation of the hydrogen generating systems. The generated hydrogen flows from the interior space of the tube cathode, for instance to a gas collection unit or device. In a further embodiment, the interior space is filled or partially filled with a liquid. Hydrogen generated during operation of the hydrogen generating microbial fuel cell moves from the liquid containing interior space, for instance to a gas collection unit or device, efficiently with little back pressure into the liquid in the interior space. The inclusion of a liquid in a tube cathode aids in hydrogen evolution since it results in phase separation of the hydrogen gas and liquid, reducing back diffusion into the anode compartment. Larger amounts of hydrogen are recovered using a liquid in the cathode interior space. A liquid included in the interior space may be any of various liquids compatible with the cathode materials and with hydrogen gas. Suitable liquids include aqueous liquids, such as water, which may contain one or more salts, buffers, or other additives.

In some embodiments, the cathode is operated so that water is pulled through the porous membrane material of the cathode, allowing contact of the water with the conductive coating or conductive matrix of the membrane. The membrane material can be enriched with carbon black to make it conductive, made with graphite fibers, or coated in a way that still permits water flow through the device.

Optionally, and preferably in some embodiments, the cathode is a gas cathode. In particular embodiments, an included cathode has a planar morphology, such as when used with a brush anode electrode. In this configuration, the cathode is preferably a gas diffusion electrode.

Optionally, an included cathode is disposed in an aqueous medium, with dissolved oxygen in the medium serving to react at the cathode.

In one embodiment of the invention a cathode membrane is substantially impermeable to water.

In particular embodiments, the cathode contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas. Thus, in one embodiment an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. The CDL may be hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

In a further embodiment, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. A CPL further acts to provide a support for bacterial colonization in the vicinity of the cathode, allowing for scavenging of oxygen in the cathode area without biofouling.

In one embodiment, a CPL is configured such that it is in contact with an inner surface of a cathode. Thus, for instance, a CPL may be configured to cover or surround the inner surface of the cathode partially or wholly, such as by bonding of the CPL to the cathode.

In a further embodiment, a CPL is present in the interior of the reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode and the catalyst. Further, a filter may be positioned between an inlet channel and/or outlet channel and the interior of the reaction chamber or a portion thereof. Suitable filters may be configured to exclude particles larger than 0.01 micron-1 micron for example. A CPL may also include material that aids bacterial attachment, so that bacteria can scavenge dissolved oxygen that can leak into the system.

Ion Exchange Materials

A cation exchange material is permeable to one or more selected cations. Cation exchange material is disposed between the cathode compartment and the saline material compartment forming a cation selective barrier between the cathode compartment and the saline material compartment. According to embodiments of the present invention, the cation exchange material is in the form of a cation exchange membrane. Cation exchange materials include, but are not limited to, ion-functionalized polymers exemplified by perfluorinated sulfonic acid polymers such as tetrafluoroethylene and perfluorovinylether sulfonic acid copolymers, and derivatives thereof; sulfonate-functionalized poly(phenylsulfone); and sulfonate-functionalized divinylbenzene cross-linked poly(styrene). Specific examples include NAFION, such as NAFION 117, and derivatives produced by E.I. DuPont de Nemours & Co., Wilmington, Del. Cation exchange materials include, for example, CMI cation exchange membranes made by Membranes International, Inc. New Jersey, USA. Also suitable are other varieties of sulfonated copolymers, such as sulfonated poly(sulfone)s, sulfonated poly(phenylene)s, and sulfonated poly(imides)s, and variations thereof.

Functionalized RADEL Q, a quaternary ammonium-containing poly(sulfone) catalyst binder is optionally used when ammonium bicarbonate is present in the catholyte to improve system performance.

An anion exchange material is permeable to one or more selected anions. Anion exchange material is disposed between the anode compartment and the saline material compartment forming an anion selective barrier between the anode compartment and the saline material compartment. According to embodiments of the present invention, the anode exchange material is in the form of an anion exchange membrane.

Anion exchange materials include, for example, quaternary ammonium-functionalized poly(phenylsulfone); and quaternary ammonium-functionalized divinylbenzene cross-linked poly(styrene). Further examples include AMI ion exchange membranes made by Membranes International, Inc. New Jersey, USA. Tokuyama Corporation, JAPAN, also produces a range of anion exchange membranes such as AHA and A201 that can be included in a system according to embodiments of the invention. Fumatech, GERMANY, anion exchange membranes, FAA, can be included in a system according to embodiments of the invention.

Catalyst

Optionally, a catalyst for enhancing a desired reaction at the cathode is included in a cathode according to the present invention. Thus, a catalyst for enhancing reduction of oxygen is included in systems according to embodiments of the present invention. Further, a catalyst for enhancing reduction of protons to hydrogen gas, that is enhancing a hydrogen evolution reaction, is included in systems according to embodiments of the present invention. An included catalyst typically enhances the reaction kinetics, e.g. increases the rate of oxygen and/or proton reduction. In addition, a catalyst reduces a need for applied potential, the overpotential, for initiating oxygen and/or hydrogen reduction.

Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production. In further embodiments, an included catalyst is, or includes, a non-noble metal containing catalyst such as CoTMPP.

In particular embodiments, systems include an activated carbon material which provides high specific surface area for oxygen reduction.

Stainless steel, molybdenum disulfide and/or nickel can be included as a catalyst in particular embodiments.

General Aspects of Systems

Power Source

No power is required but may be added if desired. Power sources used for enhancing an electrical potential between the anode and cathode are not limited and illustratively include grid power, solar power sources, wind power sources, hydrogen and fuel cells. Further examples of a power source suitable for use in an inventive system illustratively include a DC power source and an electrochemical cell such as a battery or capacitor.

Power can be supplied by including a reference electrode and setting the anode or cathode potential.

Gas Collection

A gas collection system is optionally according to embodiments of the present invention.

Hydrogen gas produced can be collected and may be stored for use, or directed to a point of use, such as to a hydrogen gas powered device.

For example, a hydrogen gas collection unit may include one or more hydrogen gas conduits for directing a flow of hydrogen gas from the cathode or cathode compartment to a storage container or directly to a point of use.

A hydrogen gas conduit is optionally connected to a source of a sweep gas. For instance, as hydrogen gas is initially produced, a sweep gas may be introduced into a gas conduit, flowing in the direction of a hydrogen gas storage container or point of hydrogen gas use.

For instance, a hydrogen gas collection system may include a container for collection of hydrogen gas from the cathode. A hydrogen gas collection system may further include a conduit for passage of hydrogen gas. The conduit and/or container may be in gas flow communication with a channel provided for outflow of gas from the reaction compartment. Typically, the conduit and/or container are in gas flow communication with the cathode, particularly where the cathode is a gas cathode.

Gas produced from the anode is $CO_2$ rich and can be delivered to the cathode compartment to lower pH in the cathode compartment, thereby regulating and maintaining appropriate pH in both anode and cathode compartments during operation, in particular embodiments.

In particular embodiments, an aqueous saline material used has a salt concentration in the range of 2 to 40 g/L of salt. Brine is optionally included in the cathode compartment and/or in one or more saline material compartments.

Reaction Chamber and Associated Components

A channel is included defining a passage from the exterior of the reaction chamber to the interior in particular embodiments. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of liquid or gas into and/or out of a reaction chamber.

Figure 1:
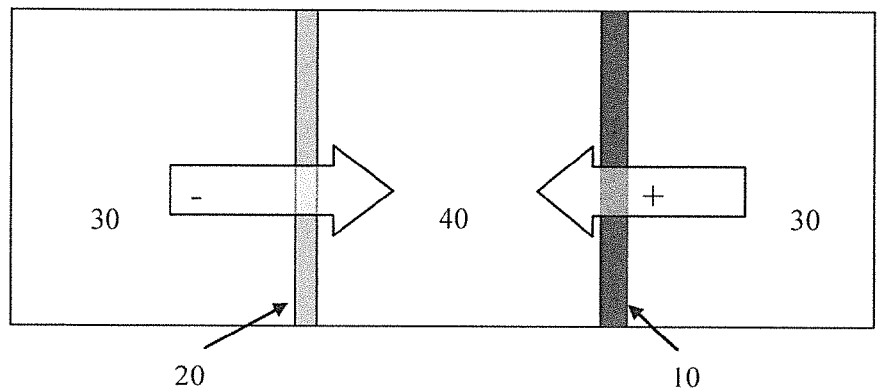
FIG. 1 is a schematic illustration of a repeating subunit of a RED system.
Figure 2:
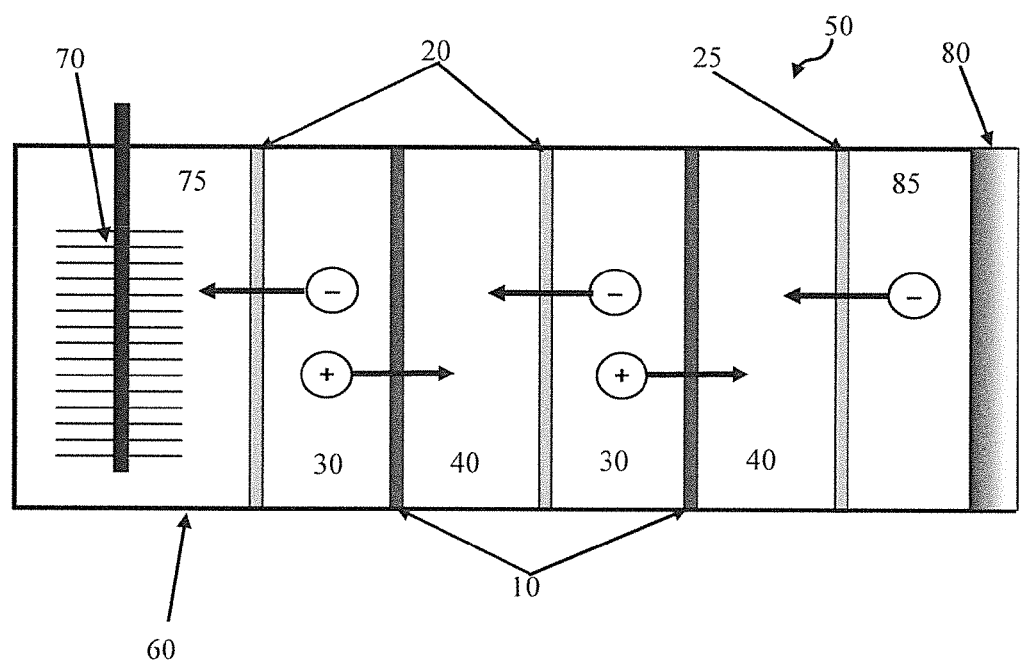
FIG. 2 is a schematic illustration of a system of the invention including two RED subunits.
Figure 3:
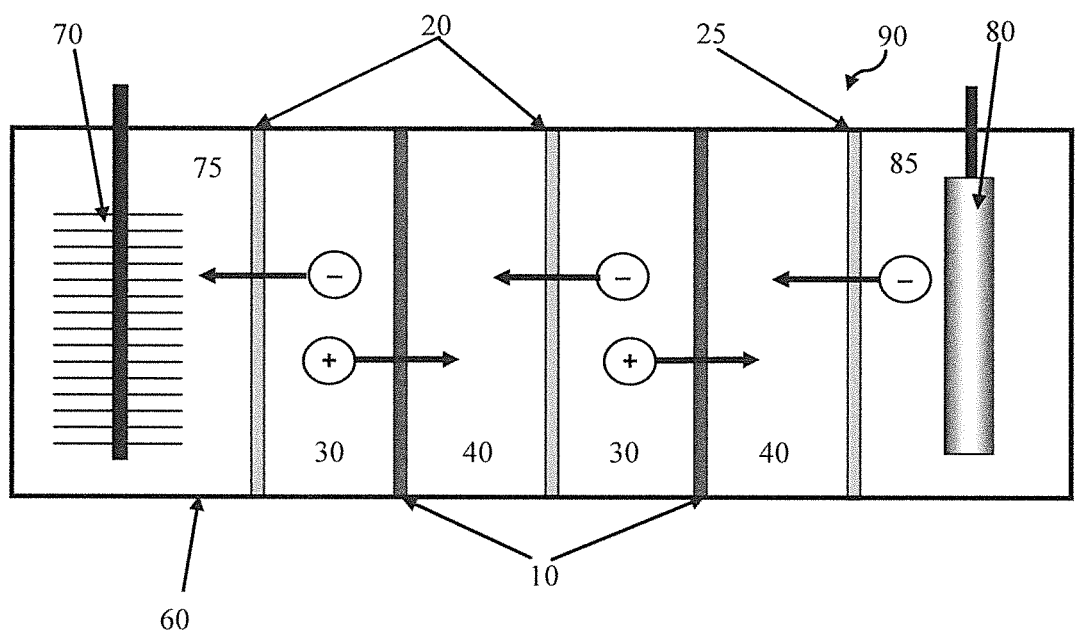
FIG. 3 is a schematic illustration of a system of the invention including two RED subunits.
Figure 4:
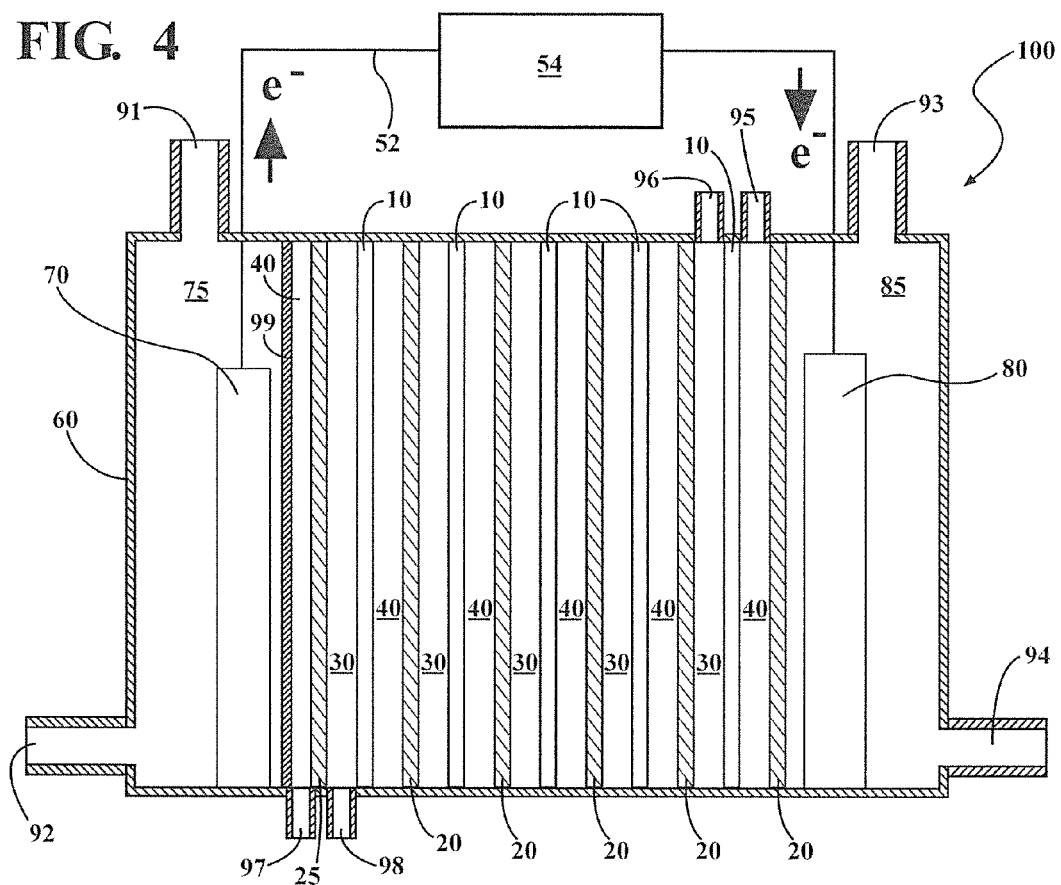
FIG. 4 is a schematic illustration of a RED stack including 10 cells in total, with 5 saline material, seawater, compartments and 5 lower-saline material, river water, compartments alternately sandwiched between the anode and cathode compartments.
Figure 5A:
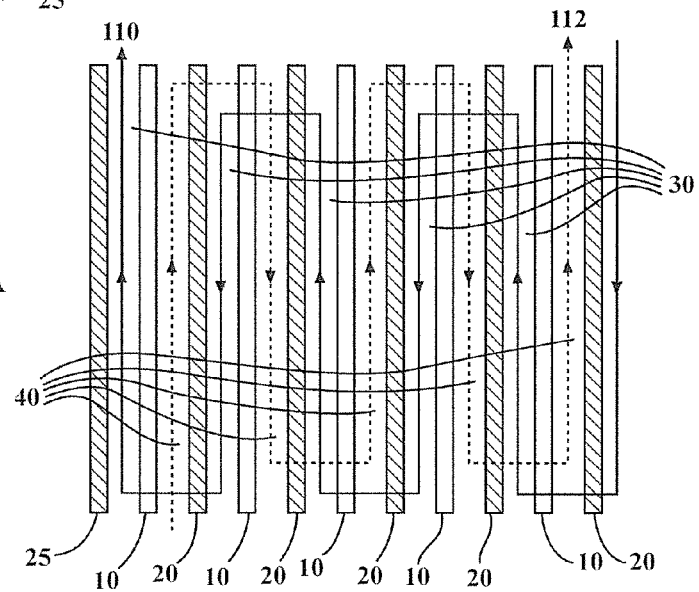
FIG. 5A is a schematic illustration of counter-current flow paths of a saline material and a lower-saline material through saline material compartments or lower-saline material compartments, respectively.
Figure 5B:
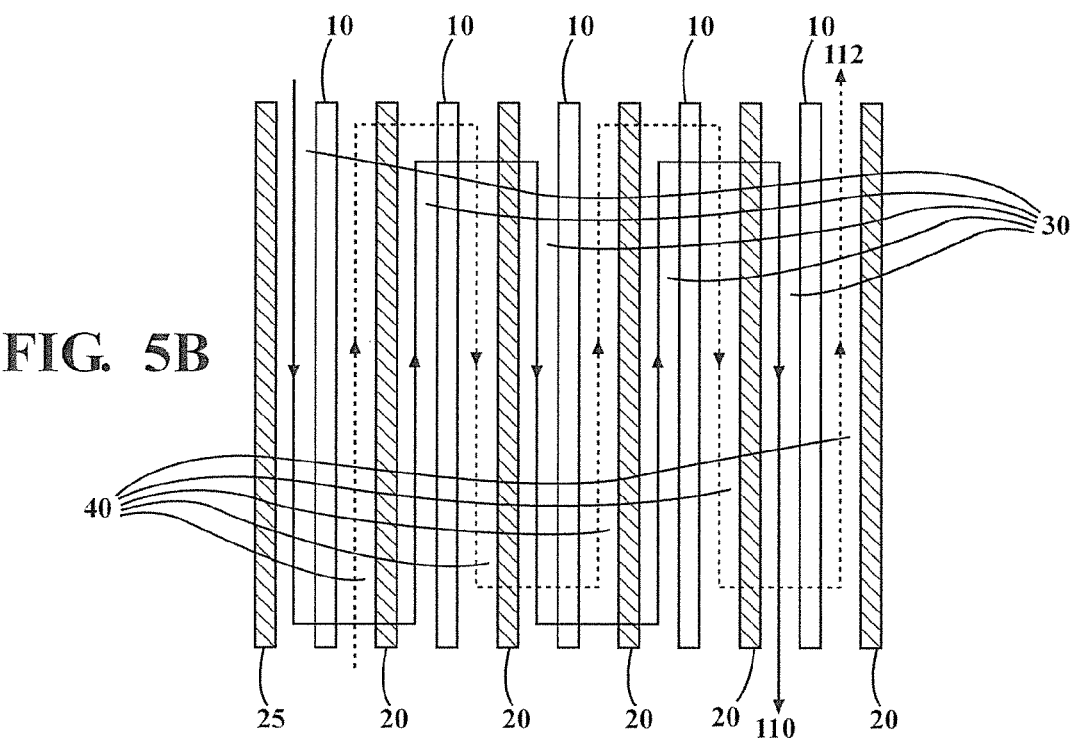
FIG. 5B is a schematic illustration of co-current flow paths of a saline material and a lower-saline material through saline material compartments or lower-saline material compartments, respectively.
Figure 5C:
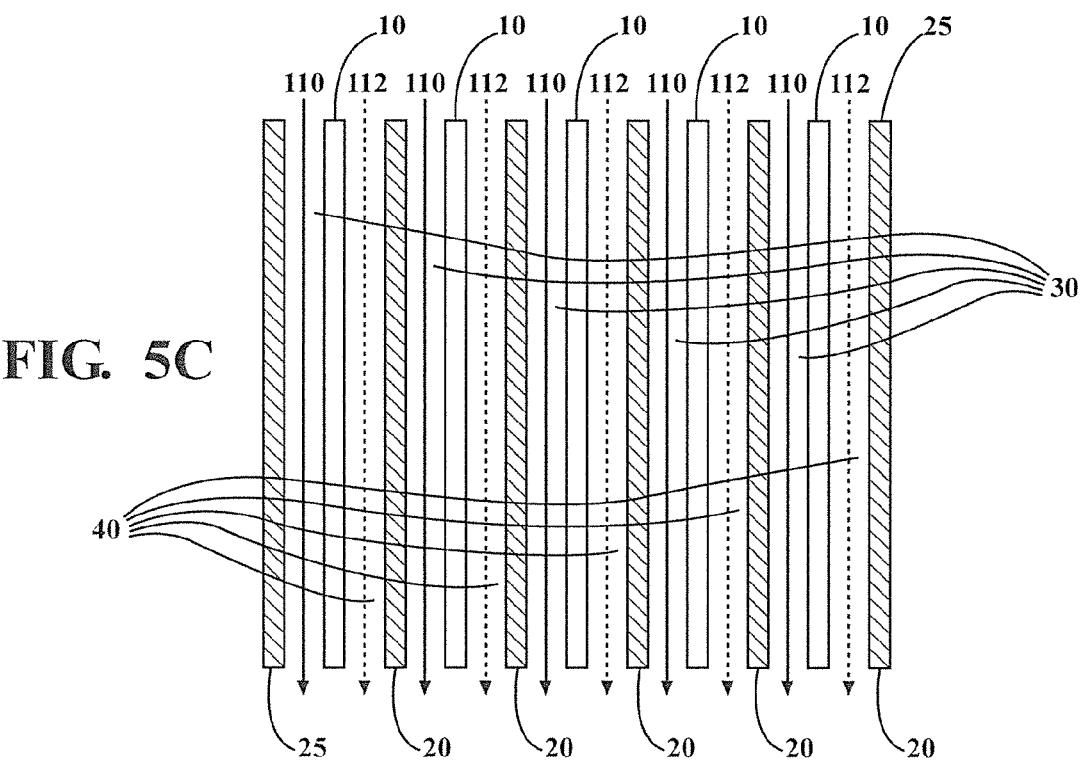
FIG. 5C is a schematic illustration of parallel flow paths of a saline material and a lower-saline material through saline material compartments or lower-saline material compartments, respectively.
Figure 6:
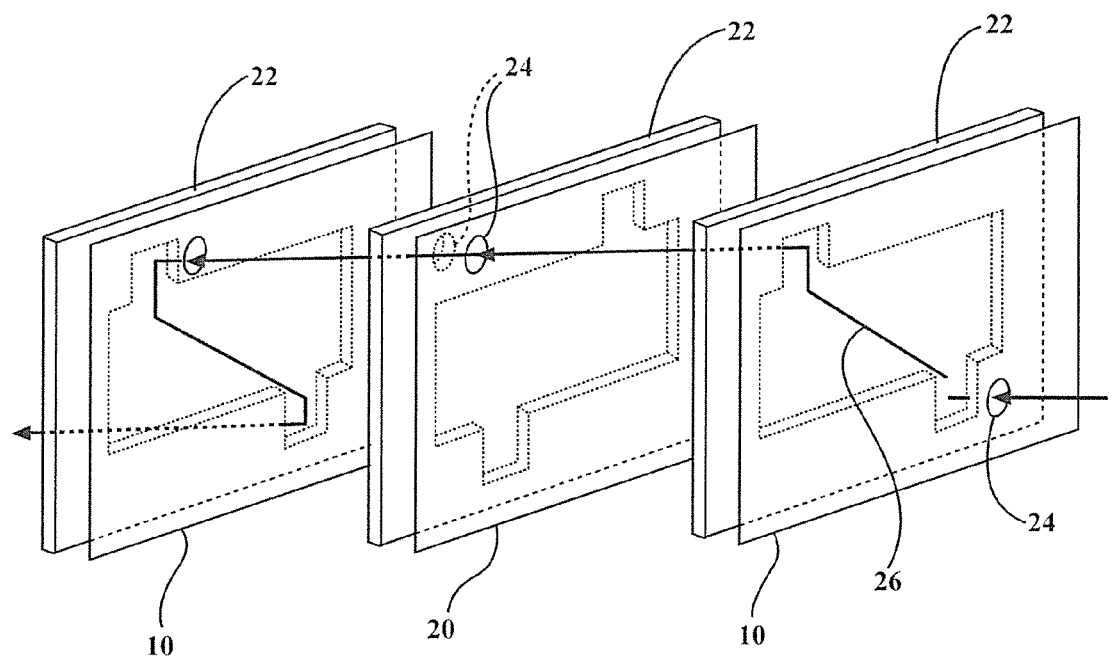
FIG. 6 is a schematic illustration of an anion-selective barrier, two cation-selective barriers, gaskets and a flow path for a lower-saline material.
Figure 7:
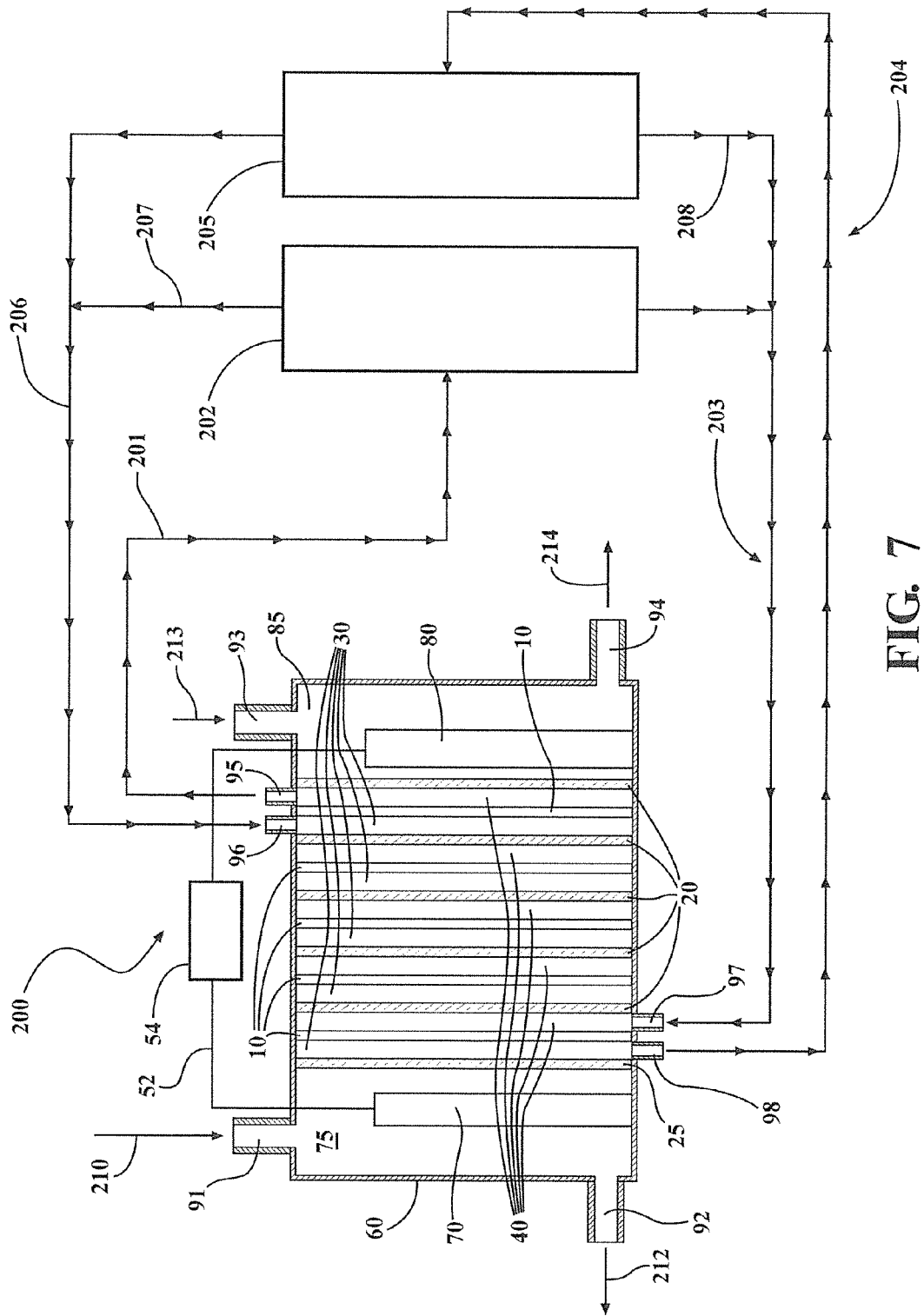
FIG. 7 is a schematic illustration of a system according to aspects of the present invention including a conduit for transport of a lower-saline material effluent from the lower-saline material compartment to a container having a first liquid containing portion adjacent a heat source, a vapor condenser portion and a second liquid containing portion for containing condensed vapor; and a conduit for transport of a regenerated lower-saline material from the second liquid containing portion for containing condensed vapor to the lower-saline material compartment.

Embodiments of inventive compositions and methods are illustrated in the following examples. These examples are provided for illustrative purposes and are not considered limitations on the scope of inventive compositions and methods.

EXAMPLES

Hydrogen Generation in a System Including an RED and Using a Heat-Regenerated Salt Solution Two cubes of polycarbonate are drilled to produce cylindrical anode and cathode chambers 3 cm in diameter and 4 cm long (30 mL each). A cylindrical glass tube for gas collection is attached on the top of the cathode chamber and sealed with a butyl rubber stopper and an aluminum crimp cap. The RED stack, situated between the anode and cathode chambers, includes 5 CEMs and 6 AEMs (Selemion CMV and AMV, Asahi glass, Japan) forming 5 saline material (high concentrate, HC) solution cells and 5 lower saline material (low concentrate, LC) solution cells. Silicon gaskets having rectangular open sections (4×2 cm$^2$) for flow are placed between adjacent membranes (empty bed volume of 1 mL) that contain a polyethylene mesh spacer to prevent membrane deformation (0.13 cm thick). The anodes are heat treated graphite fiber brushes (0.25 cm diameter×0.25 cm length; fiber type; PANEX 33 160 K, ZOLTEK). The cathodes are made from stainless steel mesh (Type 304, #60 mesh, wire diameter 0.019 cm, pore size 0.0023 cm; McMaster-Carr), a Pt catalyst (0.5 mg Pt/cm$^2$), and carbon particles and a binder (Vulcan XC-71, 33.3 mL/cm$^2$ of 5 wt % Nafion; projected cross sectional area of 7 cm$^2$). Each chamber is equipped with an Ag/AgCl reference electrode (RE-5B; BASi) to measure electrode potentials and stack voltage.

The anode solution contains 1.0 g/L $CH_3COONa$ and a buffered solution consisting of 8.4 g/L $NaHCO_3$, 0.31 g/L $NH_4Cl$, 0.13 g/L KCl, 0.05 g/L $Na_2HPO_4$, 0.03 g/L $NaH_2PO_4.H_2O$. The cathode chamber is filled with 1 M $NaHCO_3$ solution (~55 mS/cm) unless otherwise noted. The saline material solution is 1.4 M $NH_4HCO_3$ solution, with the concentration of $NH_4HCO_3$ in the lower saline material solution adjusted to produce salinity ratios (SRs) of 100, 200, 400, and 800. In some tests, low conductivity deionized (DI) water is used as the lower saline material solution, resulting in an SR defined as "Infinite", as the conductivity of the DI water is <0.0004 mS/cm. Each solution is supplied into the stack at a fixed flow rate of 0.8 mL/min. The saline material solution is pumped into the saline material cell from the cathode chamber and flows serially through 5 saline material chambers in the RED stack. Similarly, the lower saline material solution flows through all the 5 lower saline material chambers, but in the opposite direction from the anode to cathode side in this example. All experiments are performed at room temperature.

Gas is collected for analysis in gas bags (0.1 L capacity; Cali-5-Bond, Calibrated Instruments Inc.) with gas volume measured using a respirometer (AER-200; Challenge Environmental). Gas chromatographs (GCs; SRI Instruments) are used to analyze the gas composition in the reactor headspace as well as in the gas bags for $H_2$, $N_2$, $CO_2$ and $CH_4$. Total chemical oxygen demand (COD) is measured at the beginning and end of each batch (COD Reagent; HACH Co.). Total ammonia concentration (nitrogen-ammonia reagent (salicylate), HACH Co.) is determined with a UV spectrophotometer (DR2010, HACH Co.). The pH and conductivity of samples are monitored with conductivity and pH meters (SevenMulti, Mettler-Toledo International Inc.). A 10Ω resistor is connected between the anode and cathode to measure current using a multimeter (Model 2700, Keitheley Instrument).

The performance of the system can be evaluated in terms of: coulombic efficiency ($\eta_{CE}$, %) based on total coulombs recovered compared to the mass of substrate consumed; cathodic hydrogen recovery ($r_{cat}$, %); volumetric hydrogen production rate (Q, m$^3$ $H_2$/m$^3$/d) normalized to the anolyte volume; and hydrogen yield (Y, mole $H_2$/mole acetate) based on the hydrogen produced and acetate consumed. The volumetric current density ($I_{vol}$, A/m$^3$) is an average of the maximum current production over a 1 h period divided by the anolyte volume. Cathode overpotential is calculated by subtracting the theoretical cathode potential calculated by the Nernst equation from the measured cathode potential.

Energy recovery ($r_E$) is calculated relative to the total energy provided to the system as the ratio of energy content of hydrogen produced:

$$r_E = \frac{\Delta H_{H_2} n_{H_2}/t_B}{\Delta H_S n_S^{in}/t_B + X_{in}} \times 100$$

where $\Delta H$ is the heat of combustion (J/mol), $t_B$ the time span for each batch cycle, the superscripts in and s denote the influent and the substrate, respectively, and $X_{in}$ is the theoretical energy (W) estimated by the change in the free energy involving complete mixing of saline material and lower saline material solutions as:

$$X_{in} = RT\left(V_{LC} c_{LC}^{in} \ln \frac{a_{LC}^{in}}{a_M} + V_{HC} c_{HC}^{in} \ln \frac{a_{HC}^{in}}{a_M}\right)$$

where R the gas constant, T the absolute temperature, V the volume of solution, c the molar concentration, and a the activity. The subscripts HC, LC, and M denote high concentration (saline material), low concentration (lower saline material), and mixed solutions, respectively. The energy leaving the reactor is similar, but based on the conditions for the water leaving the reactor (superscript out). The percent change in energy of the HC and LC solutions is therefore $X_{util} = (X_{in} - X_{out})/X_{in}$.

In order to calculate energy recovery ($\eta_E$), energy leaving the system is subtracted from the added energy as:

$$\eta_E = \frac{\Delta H_{H_2} n_{H_2}/t_B}{\Delta H_S (n_S^{in} - n_S^{out})/t_B + X_{in} - X_{out}} \times 100$$

The concentration of free ammonia ($NH_3$) is calculated from $$\frac{[NH_3]}{[TAN]} = \left(1 + \frac{10^{-pH}}{10^{-(0.09018 + (\frac{2729.92}{T}))}}\right)^{-1}$$

where [$NH_3$] is the $NH_3$ concentration (mg N/L), and [TAN] is the total ammonia nitrogen concentration (mg N/L).

Any patents or publications mentioned in this specification are incorporated herein by reference to the same extent as if each individual publication is specifically and individually indicated to be incorporated by reference.

The systems and processes described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A process for generating a hydrogen gas, comprising:
introducing, in a system comprising: a reaction chamber having a wall defining an interior of the reaction chamber and an exterior of the reaction chamber, an anode at least partially contained within an anode compartment of the reaction chamber, a cathode at least partially contained within a cathode compartment of the reaction chamber, a conductive conduit for electrons in electrical communication with the anode and the cathode, a plurality of alternating anion-selective barriers and cation-selective barriers disposed between the anode and the cathode and defining alternating saline material compartments and lower-saline material compartments, a first flow path for a saline material through the saline material compartments and a second flow path for a lower-saline material through the lower-saline material compartments, wherein the saline material and the lower-saline material are adjacent and separated by the anion selective barriers and the cation selective barriers, a saline material having a concentration of dissolved salts into the saline material compartments; and introducing a lower-saline material having a concentration of dissolved salts which is lower than the saline material into the lower-saline material compartments, wherein an electromotive force established by a difference in the concentration of dissolved salts in the saline material compared to the lower-saline material, drives ions across the plurality of alternating anion-selective barriers and cation-selective barriers disposed between the anode and the cathode, thereby increasing the potential between the anode and cathode, decreasing the concentration of dissolved salts in the saline material to generate a saline material effluent, and increasing the concentration of dissolved salts in the lower-saline material to generate a lower-saline material effluent;

treating the lower-saline material effluent by: heating the lower-saline material effluent to volatilize and remove a dissolved heat regenerable salt, thereby producing a regenerated lower-saline material, or combining the lower-saline material effluent and saline material effluent, thereby producing a regenerated saline material, respectively; and introducing the regenerated lower-saline material into the lower-saline material compartments or introducing the regenerated saline material into the saline material compartments.

2. The process of claim 1, wherein a saline ratio between the saline material and the lower-saline material introduced into the saline material compartment and lower-saline material compartment is greater than 1:1.

3. The process of claim 1, wherein the saline material comprises a heat regenerable salt.

4. The process of claim 1, wherein the dissolved heat regenerable salt is selected from the group consisting of: ammonium bicarbonate, ammonium hydroxide and a combination thereof.

5. The process of claim 3, wherein the saline material comprises one or more dissolved non-heat regenerable salts, wherein the total concentration of dissolved heat regenerable salt is greater than the total concentration of the one or more dissolved non-heat regenerable salts.

6. The process of claim 1, wherein the heating comprises heating with waste heat from a second process, heat generated by a solar heater or solar collector or a combination of waste heat from a second process and heat generated by a solar heater or solar collector.

7. The process of claim 1, wherein, each lower-saline material compartment is in fluid communication with each other lower-saline material compartment, wherein each saline material compartment is in fluid communication with each other saline material compartment.

8. The process of claim 7, wherein saline material flows sequentially through each saline material compartment, wherein lower-saline material flows sequentially through each lower-saline material compartment, and wherein the saline material and lower-saline material flow in a counter-current direction or co-current direction with respect to each other.

9. The process of claim 1, wherein the saline material is a brine solution from a reverse osmosis plant and the lower-saline material is a saline seawater stream.

10. The process of claim 1, wherein the cathode compartment contains a catholyte, the catholyte including a heat regenerable salt.

11. The process of claim 1, wherein the heat regenerable salt is present in a concentration in the range of 0.001M-1M.

12. The process of claim 1, wherein the system further comprises:
   a conduit for transport of a lower-saline material effluent from the lower-saline material compartment to a container having a first liquid containing portion adjacent a heat source, a vapor condenser portion and a second liquid containing portion for containing condensed vapor;
   a conduit for transport of a regenerated lower-saline material from the second liquid containing portion for containing condensed vapor to a lower-saline material compartment.

13. The process of claim 1, wherein the system further comprises:
   a conduit for transport of a lower-saline material effluent from the lower-saline material compartment to a container having a first liquid containing portion adjacent a heat source, a vapor distillation membrane and a second liquid containing portion for containing liquid condensed from vapor which passes through the distillation membrane; and
   a conduit for transport of a regenerated saline material from the first liquid containing portion to a saline material compartment.

14. The process of claim 12, wherein each lower-saline material compartment is in fluid communication with each other lower-saline material compartment and wherein each saline material compartment is in fluid communication with each other saline material compartment.

15. The process of claim 1, wherein the cathode compartment is a saline material compartment.

16. The process of claim 1, further comprising a bipolar membrane disposed adjacent the anode compartment.

17. The process of claim 1, further comprising a lower-saline compartment adjacent the anode compartment.

18. The process of claim 16, wherein a bipolar membrane disposed adjacent the anode compartment is disposed between the anode compartment and the lower-saline compartment adjacent the anode compartment.

* * * * *